US011833696B2

(12) United States Patent
Alt et al.

(10) Patent No.: US 11,833,696 B2
(45) Date of Patent: Dec. 5, 2023

(54) VISION-BASED SENSOR SYSTEM AND CONTROL METHOD FOR ROBOT ARMS

(71) Applicant: Technische Universität München, Munich (DE)

(72) Inventors: Nicolas Alt, Munich (DE); Clemens Schuwerk, Munich (DE); Eckehard Steinbach, Olching (DE); Stefan Lochbrunner, Munich (DE); Dong Qiuwei, Beijing (CN)

(73) Assignee: Technische Universität München, Munich (DE)

( * ) Notice: Subject to any disclaimer, the term of this patent is extended or adjusted under 35 U.S.C. 154(b) by 631 days.

(21) Appl. No.: 16/962,210

(22) PCT Filed: Jan. 14, 2019

(86) PCT No.: PCT/EP2019/050821
§ 371 (c)(1),
(2) Date: Jul. 14, 2020

(87) PCT Pub. No.: WO2019/138111
PCT Pub. Date: Jul. 18, 2019

(65) Prior Publication Data
US 2021/0023719 A1 Jan. 28, 2021

(30) Foreign Application Priority Data
Jan. 15, 2018 (DE) .................... 10 2018 100 773.6

(51) Int. Cl.
*B25J 9/16* (2006.01)
(52) U.S. Cl.
CPC ... *B25J 9/1697* (2013.01); *G05B 2219/39391* (2013.01)

(58) Field of Classification Search
CPC ........ B25J 9/1697; G05B 2219/39387–39397; G05B 2219/39484; G05B 2219/39248; G05B 2219/39367
See application file for complete search history.

(56) References Cited

U.S. PATENT DOCUMENTS 9,205,564 B2 12/2015 Popovic et al.
9,757,862 B2 9/2017 Alt et al.
(Continued)

FOREIGN PATENT DOCUMENTS

| EP | 2402124 B1 | 10/2018 | |
| WO | 2016193781 A1 | 12/2016 | |
| WO | WO-2016193781 A1 * | 12/2016 | ............ B25J 9/1697 |

OTHER PUBLICATIONS

Hebert et al., "Combined Shape, Appearance and Silhouette for Simultaneous Manipulator and Object Tracking", May 2012, IEEE International Conference on Robotics and Automation, pp. 2405-2412 (Year: 2012).*
(Continued)

*Primary Examiner* — Spencer D Patton
(74) *Attorney, Agent, or Firm* — Smartpat PLC

(57) ABSTRACT

A method for determining the joint positions of a kinematic chain uses only an imaging sensor and a computing unit. Characteristic features on the links and joints of the kinematic chain are identified and the joint positions are calculated from these visual measurements. The robot can be controlled without the use of joint encoders. A sensor system for monitoring the status of a kinematic chain includes a computing unit and an imaging sensor. The imaging sensor may be mounted to the kinematic chain or in the surroundings of the kinematic chain and monitors the kinematic chain and/or the surroundings of the kinematic chain. The computing unit determines a pose and/or movement parameters of at least one element of the kinematic chain by analyzing
(Continued)

an output signal of the imaging sensor, in particular by analyzing characteristic features and determines a rotational joint position by analyzing the characteristic features.

20 Claims, 8 Drawing Sheets

(56) References Cited

U.S. PATENT DOCUMENTS

| | | | |
|---|---|---|---|
| 10,393,603 B2 | 8/2019 | Alt et al. | |
| 2015/0094856 A1* | 4/2015 | Popovic | B25J 9/1697 382/103 |

OTHER PUBLICATIONS

G. G. Rigatos; P. Siano, "Sensorless Control of Electric Motors with Kalman Filters: Applications to Robotic and Industrial Systems", Int. Journal of Advanced Robotic Systems, (20110000), vol. 8, No. 6, pp. 62-80.

L. Ferraz; X. Binefa; F. Moreno-Noguer, "Leveraging Feature Uncertainty in the PnP Problem", British Machine Vision Conference (BMVC), 2014.

Seth Hutchinson, Gregory D Hager, Peter I Corke, "A Tutorial on Visual Servo Control", IEEE Transactions on Robotics and Automation, 19961001, IEEE Inc, New York, US, vol. 12, Nr: 5.

\* cited by examiner

VISION-BASED SENSOR SYSTEM AND CONTROL METHOD FOR ROBOT ARMS

TECHNICAL FIELD

The present disclosure relates to a sensor system and method for monitoring and controlling a kinematic chain, such as a robot arm or a robot including such a robot arm. More particularly, it relates to a sensor system and a method which includes image-providing sensors having a high resolution meaning e.g., HD or better, in at least two dimensions, such as 2D cameras, 3D cameras, etc.

BACKGROUND

Robot arms, herein also referred to as "robots", are extensively used in mass production and industrial automation. They are entering more and more other markets as well, including medical, agriculture, logistic, entertainment and home appliances. Generally speaking, robot arms are used to place an object or tool to a given point (more precisely into a given pose, i.e. a 3D point and a 3D orientation) in space, to move it along a trajectory, or to perform other kinds of manipulation. The motion is planned and commanded by a control system connected to the robot arm. For intelligent robots, motion planning also considers a representation of the environment in order to avoid collision with obstacles.

Robot arms are modeled as so-called kinematic chains. Kinematic chains consist of joints and links (i.e., connection elements) between the joints. One common design for robot arms is the jointed-arm robot made of rotary joints, wherein the joints are driven (or actuated) by electric motors such as servo motors. Other designs also use, e.g., linear joints. Typical robot arms exhibit between four and seven axes or joints. Thereby, six axes are required to represent all six degrees of freedom of a pose in 3D space. A seventh joint is sometimes added to increase the workspace and to allow for additional freedom in motion.

In order to follow a defined trajectory or to reach a given pose, state-of-the-art robots determine their current configuration, i.e. their joint angles, using joint or position sensors. These sensors are usually built into each joint.

On state-of-the-art robot arms, precise angle encoders are typically built into each joint of the robot to determine its current absolute or relative/incremental angular or linear position and velocity. These sensors rely on optic, magnetic or mechanic principles to provide absolute or relative position readings of the joint axis. Relative sensors are often combined with an additional sensor for zeroing. Processing electronics are typically built directly into the sensor module and wired through the arm. Many industrial systems offer a positioning accuracy of the end-effector of about 0.1 mm or better (less), based on these sensors and accurately mounted links.

Arms for cooperative robots or service robots use additional sensors, such as torque sensors in the joints, proximity sensors, touch sensors on their surface or force-moment-sensors on the end-effector. These sensors are for instance used to interact with a changing environment and to allow for safe interaction with humans. In addition, many of these robots use cameras in various places to support tasks like human tracking, object detection, pose detection, navigation, or grasp planning. Cameras are essential for any robot that operates in so-called unstructured environments. i.e. environments where the type and location of objects is not known a priori and must instead be determined by a system for environment perception or scene understanding.

The described techniques for monitoring or determining the movement and positional/locational status of robot arms or robots leave room for improvement. Hence, there is a need for the present invention.

SUMMARY

According to a first aspect, a sensor system for monitoring the status of a kinematic chain having elements comprising links and joints is provided. The sensor system includes a computing unit and at least one imaging sensor operably connected to the computing unit. The at least one imaging sensor is adapted to be mounted to the kinematic chain or to be mounted in the surroundings of the kinematic chain and is adapted for monitoring at least a part of the kinematic chain and/or the surroundings of the kinematic chain. The computing unit is adapted to determine a pose and/or movement parameters of at least one element of the kinematic chain by analyzing an output signal of the at least one imaging sensor, in particular by analyzing characteristic features in an output signal of the at least one imaging sensor. Therein, the computing unit may be adapted to determine a rotational joint position of at least one joint by analyzing the characteristic features. The characteristic features may be provided on at least one link and/or at at least one joint, such as at the at least one joint, and/or in the surroundings of the kinematic chain.

According to a second aspect, a method for determining a pose and/or movement parameters of at least one element of a kinematic chain having elements comprising links and joints is provided. The method includes visually monitoring at least one element of the kinematic chain and/or the surroundings of the kinematic chain with at least one imaging sensor, identifying characteristic features of the at least one element or of the surroundings in an output signal of the imaging sensor, and calculating the pose and/or the movement parameters of the at least one element on the basis of the characteristic features. The method may include determining a rotational joint position of at least one joint by analyzing the characteristic features.

Throughout this disclosure, the terms "kinematic chain" and "robot arm" are partly used synonymously. Also, the imaging sensors generally employed in embodiments are, with some noted exceptions, mainly cameras of various types described below. Therefore, where applicable, the term "camera" is used to describe an exemplary specific type of imaging sensor. Cameras as used herein typically, but not necessarily have a resolution of about HD or better. Further, the terms "characteristic feature", "characteristic visual feature", "visual characteristic feature", and "visual feature" may be used interchangeably in this disclosure. Generally, imaging sensors such as, e.g., cameras, may be mounted to or at the kinematic chain of a robot arm, or in the surroundings of the robot arm, and/or also both of the former.

BRIEF DESCRIPTION OF THE DRAWINGS

By way of example the following figures will be used to describe embodiments of the invention. Thereby, the figures show.

DETAILED DESCRIPTION

Figure 1A:
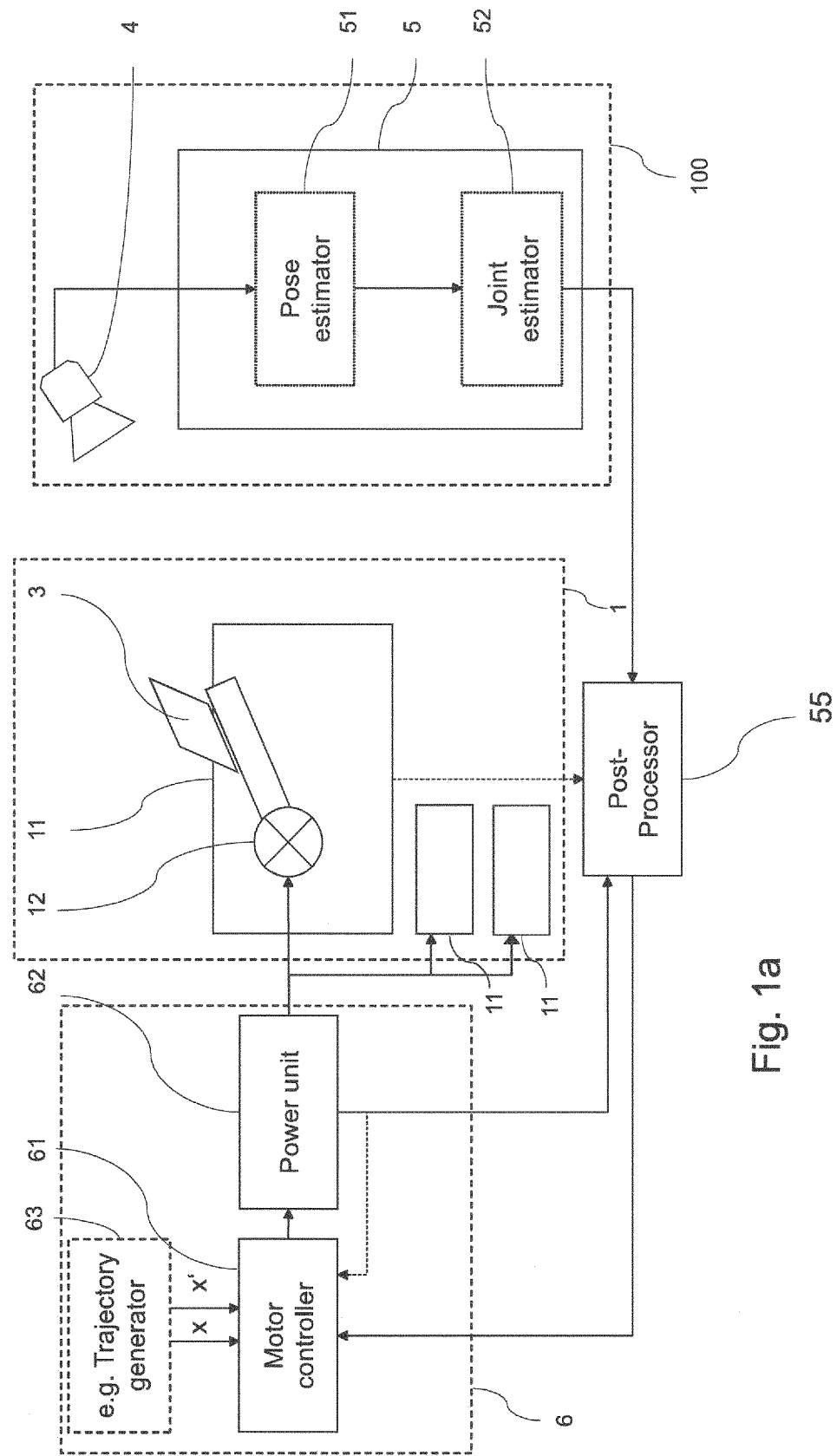
FIG. 1a: A schematic diagram of a sensor system according to embodiments of the invention, together with a robot arm and a control unit for it.

In the following, some aspects of the invention are described. Generally, all described aspects are combinable with each other and with embodiments described further below to yield further embodiments, as long as the obtained combinations are technically feasible, or unless otherwise stated.

According to an aspect, the computing unit of a sensor system according to the first aspect or other aspects is adapted to recognize the pose and/or movement parameters of the at least one element of the kinematic chain on the basis of characteristic features of the at least one element, typically being a link or joint, in the output signal of the imaging sensor.

According to an aspect, the computing unit is adapted to determine the rotational joint position of at least one joint by analyzing characteristic features provided on at least one link and/or characteristic features provided at the at least one joint, and wherein preferably, the rotational joint positions of at least three joints are determined on the basis of an analysis of characteristic features and of stored information on the structure of the kinematic chain.

According to an aspect, the at least one imaging sensor is adapted to be mounted in the surroundings of the kinematic chain and to have a field of view covering at least the kinematic chain and/or covering an apparatus, typically a robot arm, including the kinematic chain, and wherein optionally, the at least one imaging sensor is adapted to be mounted to the kinematic chain, and wherein the pose and position of the at least one imaging sensor is determined by the computing unit on the basis of an analysis of the output signal(s) of the at least one imaging sensor.

According to an aspect, the at least one imaging sensor is adapted to be mounted on an element of the kinematic chain and is adapted to monitor the surroundings of the kinematic chain, and wherein the computing unit is configured to determine the pose of the imaging sensor from analyzing the output signal of the imaging sensor and to determine a pose of at least one element in the kinematic chain on the basis of the pose of the imaging sensor.

According to an aspect, the imaging sensor is at least one of: a 2D video camera, a 3D video camera, and a 3D scanner.

According to an aspect, the computing unit comprises: stored information about properties of the kinematic chain, preferably including geometrical data and data about the degrees of freedom of movement of the kinematic chain; and information about characteristic visual features of at least one element of the kinematic chain, and/or information about the surroundings of the kinematic chain.

According to an aspect, a sensor system further includes a control unit operably coupled to the computing unit, wherein the control unit is configured to control the kinematic chain, and wherein preferably, the computing unit provides pose information and/or velocity information of at least one element of the kinematic chain, preferably of all elements, to the control unit.

According to an aspect, in a method according to a second aspect or further aspects, from an output signal of an imaging sensor mounted in the surroundings of the kinematic chain, the rotational joint position of at least one joint, and preferably of at least three joints, is determined by the computing unit by analyzing characteristic features of the at least one joint and/or of at least one link connected to it.

According to an aspect, an estimation of the position of at least one joint is carried out by monitoring optical markers and/or textures provided at a movable part of an actuator and/or at a movable part of a gear operably connected to an actuator, and by determining the movement of a link and/or joint actuated by the actuator from analyzing the movement of the optical markers or textures.

According to an aspect, from an output signal of an imaging sensor mounted to an element of the kinematic chain, the rotational joint position of at least one joint, and preferably of at least three joints, is determined by the computing unit by analyzing characteristic features in the surroundings of the kinematic chain while taking into account information on the kinematic chain stored in the computing unit.

According to an aspect, the imaging sensor is mounted to a moving part of the kinematic chain, wherein the computing unit determines the pose of the imaging sensor by analyzing features of the surroundings, and wherein the configuration of joints between a base link and the imaging sensor is indirectly determined from the pose of the imaging sensor and on the basis of information on the kinematic chain stored in the computing unit.

According to an aspect, a robotic arm or a robot including a kinematic chain, and a sensor system according to aspects is provided. Preferably, the pose and movement control of the kinematic chain is exclusively carried out by a method according to aspects for at least three joints of the kinematic chain, and more preferably, for all joints of the kinematic chain.

In the following, some terms used throughout this disclosure shall be defined and/or described.

As used herein, the terms "Forward kinematics" and "inverse kinematics" are an essential subsystem of most robot arms and robots. They are intended to mean a conversion between the joint space of the robot and the Cartesian space. For instance, a goal point is typically given in the (Cartesian) work space of the robot. Inverse kinematics determines the corresponding joint configuration in the joint space to reach this goal point. Depending on the specific application, position and velocity control may be performed both in Cartesian and in joint space.

The term "Visual servoing" is intended to mean a process of moving the kinematic chain towards a goal position by tracking features from an image of the imaging sensor, such as a 2D camera or 3D camera. Exemplarily, the camera may be mounted on an end-effector of the robot and thus moves with the robot. A motion command, typically a velocity signal in Cartesian space, is derived from the position offset between the observed features and their desired position. Visual servoing systems rely directly on the Jacobian or on inverse kinematics, and low-level control systems to execute these motion commands.

The terms "trajectory planning" or "motion planning" are intended to mean a process which includes planning of the exact trajectory that an end-effector (of a kinematic chain, e.g., a robot arm) should follow. For many tasks carried out by employing embodiments described herein, such as picking or placing objects, only the final pose or the "endpoint" of the trajectory is relevant, while the trajectory only needs to fulfill certain constraints. Other tasks, such as welding along an edge or surface inspection, the robot is required to follow well-specified lines or curves during its motion. In both cases, trajectory planning provides a sequence of points sampled with a constant rate. Each point comprises of a position and optionally speed and acceleration. Trajectories may be planned online, i.e. while the arm moves, or offline, i.e. before the arm starts its motion. The planners consider various constraints, such as joint position, velocity, and acceleration limits. This ensures that the arm is physically capable to follow the provided trajectory. More complex systems, according to embodiments described herein, further include collision avoidance by considering obstacles around, meaning in the surrounding, of the robot arm or robot.

Programming languages for robots, such as exemplarily Kuka KRL, are typically relevant for industrial settings, where they often represent the main interface to a robot arm. These languages build on inverse kinematics and low-level control to provide motion primitives, such as "go to a point", "set velocity" or "follow a line". They are typically used by integrators and end-users of robotic systems to build their applications, and may typically also be employed in embodiments described herein, unless otherwise stated.

As used herein, the term "control goal" is intended to mean signals received from a higher-level control, which are fed into a respective control loop. Depending on the higher-level system, control goals may consist of different values. For instance, a complex trajectory planner might provide position, velocity, and acceleration goals, while a visual servoing system only provides velocity goals. Cascaded control systems are typically used for servos based on actuators 12 like brushless DC (BLDC) motors which are commonly used on professional robots, for brushed DC motors and similar motors. Stepper motors, which may, e.g., be used on smaller robot arms, can be driven directly with the desired speed, while acceleration limits are considered in the control.

The interface between low-level control and higher-level control may typically follow standards, such that any mid-level or high-level controller or task planner may be connected to the low-level controller. Such interfaces are for instance defined in ROS (Robot Operating System) and MoveIt. The low-level controller itself, on the other hand, may typically be custom-made for a specific robot arm.

This disclosure is mainly, but not exclusively, concerned with low-level control, which is defined more precisely further below, for example with respect to FIG. 1a. The interface of a low-level controller follows certain standards and thus allows to connect to any existing or new method for mid- or high-level control. It should be mentioned that the information provided by imaging sensors, such as the high resolution cameras of various types disclosed herein and employed according to embodiments, is typically processed on a level of low-level control, but may be processed by high-level task planning or high-level control as well.

Generally, according to embodiments, a camera-based sensor system for position and velocity sensing of robot arms or other kinematic chains are provided, as well as corresponding control units. Thereby, one or multiple cameras are either (a) mounted at a fixed point, observing parts of or the entirety of a kinematic chain, and/or (b) are mounted at the end-effector of the kinematic chain, observing the environment of the arm and potentially a tool mounted on the arm, and/or (c), are mounted somewhere within the kinematic chain, observing both the environment and a part of the kinematic chain. The cameras are typically connected to a computing unit, also called vision processor herein, which detects and tracks image features within the camera image. These image features (or characteristic features) are observations of visual features or markers, referred to as characteristic features, which are mounted on the arm or within the environment. The characteristic features may also be intrinsic features of parts of the kinematic chain, such as a rippled surface structure of a link, the 3D-shape of a link, joint or actuator, or the likes. The image processor determines the pose or position of said visual features. Using a stored model of the kinematic chain/robot arm, it calculates the poses of individual robot links from the image features, typically including the pose of the end-effector and other relevant poses. Based on these poses, the state of the kinematic chain is determined. Additionally, redundant data from multiple features, or from other sources may be combined or fused in the above process. The state of the kinematic chain is represented directly by joint positions/angles and joint velocities, which are calculated using inverse kinematic or similar methods. Additionally, or alternatively, the Jacobian matrix between the joint space and Euclidian end-effector space is determined, enabling e.g. Cartesian velocity control of the end-effector. This matrix, referred to as "Jacobian" is a function of the current joint state and considered constant in a local region.

A control unit, comprising typically at least a motor controller and a driver unit, controls the kinematic chain/robot arm, using readings from the typically camera-based sensor system, and potentially from other sensors. Different configurations are possible, e.g. fully camera-based sensing, or a combination of vision-based position reading with velocity reading from separate sensors.

FIG. 1a is a diagram showing a system according to embodiments. A kinematic chain 1 (center of FIG. 1a) has one or more links 11 connected by joints (not shown in FIG. 1a). The kinematic chain 1 may exemplarily be a robot arm. A control unit 6 serves for controlling the movement and positioning of the kinematic chain 1. A sensor system 100 according to embodiments visually monitors the kinematic chain, or at least one link 11 or joint of the kinematic chain 1. A computing unit 5, comprising a pose estimator 51, determines the poses of various (visual) characteristic features 3 on the robot arm. The characteristic features, which may be realized in a number of ways according to embodiments, are observed by an imaging sensor 4, e.g., an optical camera, which is further specified below. A joint state estimator 52, which is typically, but not necessarily a part of the computing unit 5, calculates the joint positions of the kinematic chain 1 based on the poses derived by the pose estimator 51. A post-processor 55, which may typically, but not necessarily be a part of the computing unit 5 (in FIG. 1a the post-processor is only exemplarily shown as a separate unit), filters and post-processes the visual measurements derived from the output signal of the imaging sensor 4, and optionally integrates data from other sensors. The post-processor 55 typically provides position and velocity data to a control unit 6, which controls the motion of the kinematic chain 1, e.g., the robot arm. The control unit 6 typically comprises a high-level control system 63, e.g. a trajectory generator, a motor controller 61 and a power unit 62.

According to embodiments, the control unit 6 is intended to function as a control system for the kinematic chain 1, in particular for a robot arm or a robot. It is typically split into (several) subsystems such as described with respect to FIG. 1a above, which may be run at different rates and are generally implemented on multiple processing units or computing platforms, which may be typical general purpose computers such as single-board-computers with appropriate software, or may comprise dedicated hardware such as, e.g., ASICs. As used herein, the term "low-level motor controller" or "low-level motor control system" 61, as a part of the control unit 6, is intended to mean a real-time system that receives motion commands (herein also called control goals) for a desired position, velocity, acceleration and/or torque of each joint from higher-level controllers, e.g. from a trajectory generator 63 typically also located in the control unit 6. These commands are typically received synchronously with/at a specified rate of, e.g., 100 Hz to 1000 Hz. On the output side, the low-level control system 61 outputs signal to actuators 12, which may typically be servo motors, in particular DC motors or BLDC motors, for the joint(s) 11. These signals may, e.g., be PWM signals, that control the power unit 62 of the actuators 12. In embodiments, typical designs for the motor controller 61 employ nested control loops, usually referred to as cascaded control loops, for torque (innermost loop), velocity and position. A nested structure allows for a fast "disturbance rejection", i.e. a fast response of the control unit 6 to external influences like gravity forces and torques. Inner loops run at a higher rate than the outer ones. Typical torque controllers as employed in embodiments described herein are based on current measurements and run with a rate of up to about 50 kHz. The innermost torque control loop outputs the desired PWM duty cycle to the power unit 62, typically an H-bridge, that drives the actuators 12. In some embodiments, a stored model of the kinematic chain 1/the robot and its masses may also be taken into account to compute a "bias torque", which is forwarded to the torque controller to further improve its performance.

1. Visual Pose Estimation

As was described with respect to FIG. 1a, embodiments described herein make use of a visual pose estimation of at least one link 11 of the kinematic chain 1, which is typically realized in and by a pose estimator 51. The 6D pose (i.e., the 3D position and the 3D orientation) of an object, typically a link 11, is determined using an imaging sensor 4 providing an image, and a pose estimator 51 in a computing unit 5. The skilled person is well aware of known methods for the general problem of pose estimation from an image, which is also referred to as Perspective-n-Point (PnP) problem. A broad range of types of imaging sensors 4 (or: vision sensors) may be used according to embodiments, which include grayscale or color cameras for the visual spectrum, IR cameras, active or passive depth cameras, stereo cameras, cameras providing a color image and depth (RGBD), 3D scanners, as well as combinations of multiple sensors. A higher resolution (i.e. number of pixels) of the imaging sensor typically goes along with a higher accuracy of pose estimation. Generally, 2D cameras, 3D cameras, and 3D scanners may be used.

Generally, a 2D image from a 2D camera is sufficient for full 6D pose estimation if a model of the object or at least of visual features on the object is available, which includes physically correct geometry information. 2D cameras represent one typically used variant considered in this disclosure, as such cameras tend to be cheaper and smaller than 3D or depth cameras. Depth information may improve the accuracy of pose estimation significantly, whereby a low-noise sensor is advantageous. Many current depth cameras only provide a low-resolution or noisy measurement. Stereo cameras are another suitable type of imaging sensor and may be used as any camera in the embodiments described herein. As a combination of two 2D cameras, they offer similar benefits, and additionally provide a depth estimate.

The information used for pose estimation from an image is referred to as an image feature, representing a visual feature in the real world monitored by the imaging sensor. In the following, it is assumed that a model of the feature, more precisely, a model of the object, e.g., the kinematic chain, comprising information about features is available, i.e. the location, appearance, geometry or structure of the feature(s) is completely or partially known and stored in a memory section of, e.g., the computing unit 5. Furthermore, it is assumed that multiple features may be visible in the image provided by the imaging sensor(s). Features may be used individually or in combination to determine a full pose. Generally, the characteristic features may be an inherent part or structure of the monitored object itself, or may be attached to it by some means. In the latter case, they may also be referred to as markers.

There are numerous known methods for visual pose estimation based on a model of an object. Some methods which are well applicable in the embodiments described herein rely on the texture or surface appearance and can be classified into sparse matching and dense tracking. Sparse matching relies on feature descriptors such as SIFT, SURF or ORB, which describe the local texture at certain points or regions of interest. The descriptors from a (imaging sensor/camera) image are matched to descriptors from the model, resulting in a set of point correspondences. The correspondences are between a 2D image point (or 3D for stereo/depth cameras) and 2D or 3D model points. The 6D pose is then estimated from these correspondences using a method of pose estimation as mentioned above. Incorrect correspondences (outliers) may typically be removed using methods such as RANSAC. For planar surfaces, a homography may be estimated from 2D-to-2D correspondences, see below.

Sparse methods allow to find objects anywhere in the image, but their results are often noisy. Dense tracking methods, on the other hand, perform a local search. They can be very fast, rely directly on the pixels of an image and thus allow for low noise and in some cases sub-pixel accuracy. Commonly used trackers include KLT and ESM. They directly provide a homography, which warps a template of the model to the observed image. Deriving a 6D pose from a homography is a special pose estimation problem, referred to as homography decomposition. It requires a scale parameter, which is obtained from the size of the template. These methods may optionally be extended to process information provided by a stereo/depth camera, for instance by parallel tracking in both images, or by integrating depth estimates into the optimization equation. Thus, according to some embodiments, depth may be considered, whenever a reliable estimate is available.

If there is no (complete) model of the object or the scene available, such a model may also be built from visual data. Methods for Simultaneous Localization and Mapping (SLAM) build models or maps, simultaneously with pose estimation, for methods providing 3D models and a 6D camera pose.

In order to obtain a pose with physically correct dimensions by using an imaging sensor, such as a camera or world frame, the model of the imaging sensor, typically a camera, and its parameters of imaging should typically be known. Most non-panoramic cameras can be modelled by the pinhole camera model, together with a model for image distortion. The projection parameters are given by, e.g., the intrinsic camera matrix. Thereby, all required parameters may be determined by camera calibration methods. These methods rely, for example, on a known pattern that is observed by the camera from different positions, varying distance, location in the image and viewing angles.

A special class of pose estimation methods is concerned with tracking of articulated objects, such as wings of doors and drawers. Here, pose estimation includes the estimation of inner states of the object. Kinematic chains of robots, as employed herein, may also be theoretically considered as articulated objects, albeit with a high complexity due to the higher number of joints.

2. Visual Joint Estimation

As was described previously, in embodiments described herein, generally a pose estimator 51 performs visual pose estimation of individual parts or links of a robot arm. The pose estimation process comprises of search of known visual characteristic features (e.g. special markers, or any object with a distinct visual appearance), represented as features in the image obtained by an imaging sensor 4, a unique identification of the visual characteristic feature/object, and refinement. Some of the relevant methods were introduced in the previous section.

Generally, pose estimation can be performed using various image features, including:
  Planar templates of arbitrary texture with sufficient complexity. Possible textures include natural images and artificially created graphics;
  pseudo-random or structured patterns in black-and-white, such as commonly used binary square markers, see ARToolkit, or other patterns of colors and grey tones;
  patterns of geometric primitives, such as dots, circles, and lines. Four uniquely identifiable points are sufficient for full pose estimation;
  the above features on non-planar surfaces, such as cylinders;
  the appearance of structures on the robot arm, such as screws, geometric primitives or, as e.g. shown in FIG. 6, engravings 38;
  outer or inner contours of components of the robot arm; any suitable combinations of the above.

The following describes a system for detection and tracking of characteristic features, based on planar texture features, so-called templates, as may be employed in embodiments. It combines sparse matching and dense alignment to achieve both a high reliability and a high accuracy/low noise. Sparse matching based on SIFT, ORB or similar methods, described in the previous section, may be used for detection or search of templates anywhere in the image. Dense tracking using KLT or ESM is used to follow templates from frame to frame and for refinement. The exact 6D pose of objects can be determined in real time, i.e. at a framerate of e.g. 60 to 100 Hz or more. A standard image file with scale information serves as the model. The system is suitable to detect and track multiple planar templates—which may contain arbitrary image information—simultaneously. Thus, it may be employed for the tracking of characteristic features 3 and the subsequent pose estimation according to embodiments.

Generally, planar templates provide the advantage that a corresponding physical feature may be easily created. Textures can be printed on paper from an image file, e.g. by using a standard laser printer. The printed paper represents the visual feature, which is then attached to the link or robot part to be detected/tracked, either directly on a planar area of the surface, or on a feature mount 37. Planar templates provide flexibility, ease of use and a higher tracking accuracy than many methods base on edge features or 3D models. The printed paper may also be applied to non-planar surfaces, such as cylindrical surfaces as part of the robot. Many artificially created objects already exhibit planar texture, which may be acquired using a 2D scanner. Both scanners and laser printers can be used to create highly accurate representations of textures, if the scaling information is handled correctly.

Some sparse feature extraction methods do not run sufficiently fast, i.e. in real-time, on processors available at the time of filing of this disclosure. Therefore, feature extraction should only be run if a global search is required and be skipped otherwise. Tracking requires a rough pose estimate, which is either provided by sparse matching or by the pose from the previous frame from the imaging sensor/camera. The latter case is preferred, since it allows to skip sparse feature extraction. Poses obtained by tracking are much more accurate and less noisy than from sparse matches. Tracking is always done with the "original" model, such that there is no drift, even if performed over long periods of time.

Generally, processing may be advantageously split in multiple threads, which may run at different rates. For example, thread A performs sparse feature extraction matching, if there is currently any template whose pose is unknown. The tracker runs in thread B at the framerate of the camera and tracks all templates, for which initial pose estimates are available. If required, each tracker may run in a separate thread to reduce latency on multi-core CPUs.

The real-world pose of the template with respect to the camera is obtained by homography decomposition, given the camera parameters.

3. Setup of Features on a Robot Arm and External Imaging Sensor(s)

Figure 2:
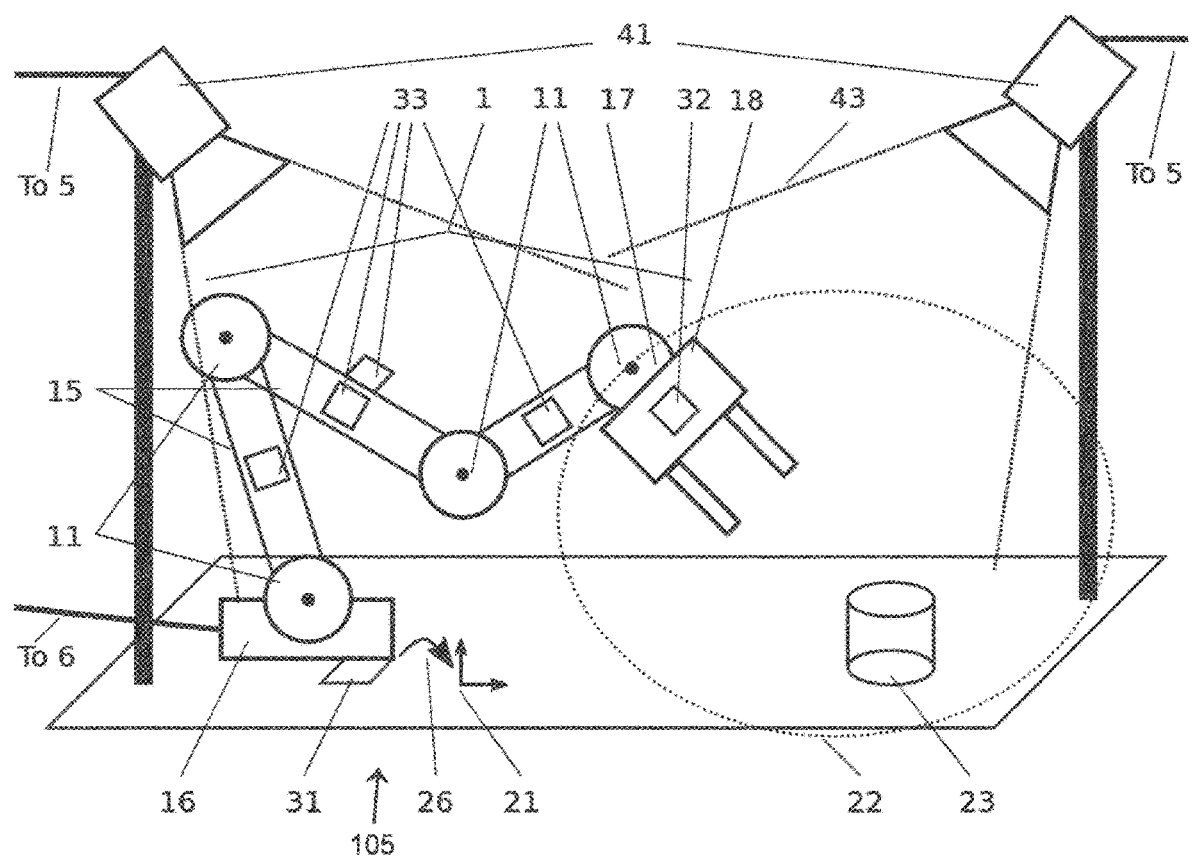
FIG. 2: A robot arm with sensors of a sensor system according to embodiments.
Figure 7:
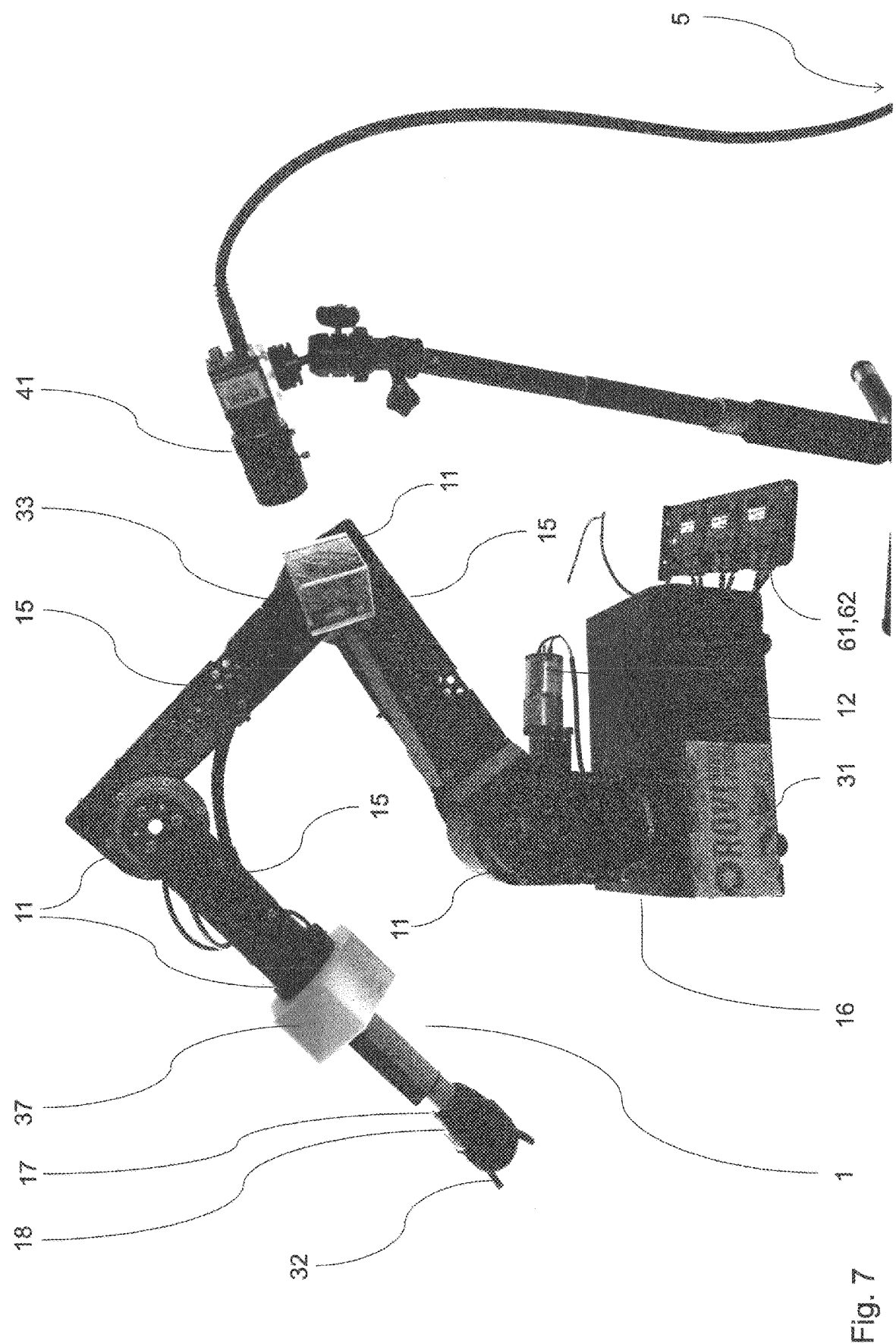
FIG. 7: An exemplary robot arm with five directly driven joints, with visual features added on the base, end-effector and on one inner link, with a camera of a sensor system.

In this embodiment, see FIG. 1a and FIG. 2, one or several cameras 4, 41 are mounted around the kinematic chain 1 or robot arm, typically within or nearby the operating space 22 of the robot arm, and looking in the direction of and at the robot arm, such that at least part of the kinematic chain is in the field of view 43. Visual characteristic features 32, 33 are placed onto some or all of the links 15 of the robot arm, including at least one feature 32 on the end-effector link 17 or tool 18, see also FIG. 7. FIG. 2 shows external cameras 41 which observe visual characteristic features 31 on the base link 16, a feature 32 provided on the end-effector, and a feature 33 provided at intermediate links of the robot arm. These features are mounted to the robot arm e.g. directly, via a feature mount 37, or they may also represent texture or structure that is already present on the robot arm itself. The pose of the feature within the frame of the link 15 is typically known from the construction drawings and represented in a model of the robot which is stored in a memory portion of the computing unit 5. The computing unit 5 comprises the pose estimator 51 and the joint state estimator 52, and is operably connected to the imaging sensor(s) 4, 41, which are typically camera(s). The visual pose estimator 51, as described further above, estimates the 6D poses of visible features in all camera images and converts these poses to a pose estimate of the corresponding links 15. The joint state estimator 52 uses these link poses to determine the (rotational) states of the joints, for instance by inverse kinematics (IK). Ambiguous solutions, which may arise as a result from this process, are resolved as discussed in section 8 further below.

In FIG. 2, an object 23 to be manipulated by the robot and located within the operating space 22 is typically also visible by at least one camera 41. A world coordinate frame 21, related to the base link 16 via pose 26, may be pre-defined or chosen arbitrarily, e.g. identical to the base link. The robot arm is controlled by a control unit 6 (not shown, see e.g. FIG. 1a).

There are various strategies for the placement of features and the calculation of joint states. The following presents some possible variants which may be employed in embodiments:

1. Minimal configuration: The joint state is determined only from the poses of both ends of the kinematic chain, i.e. in FIG. 7 and FIG. 2, the base 16 and the end-effector link 17. A visual feature 32 is present on or at the end-effector link 17, or the attached tool 18, and is used for pose estimation of this link, see also FIG. 7. Therein, a commercially available robot arm 1 with five directly driven joints 11 is shown. According to embodiment of section 3 herein, visual features 3 are added on the base 31, end-effector 32 and on one inner link 33. At least one external camera 41 observes the features and connects to a computing unit 5.

The pose of the base link 16 is determined either by a base-located characteristic feature 31 as well, or by extrinsic calibration of the base link 16 towards the camera 4, 41, if the camera remains static with respect to the base link 16. This feature configuration is possible for kinematic chains 1 of up to six joints 11. Due to noise and possible ambiguous solutions, at the current state of computing technology it may be most feasible for up to about four joints. The joint configuration is determined by calculation of IK from the pose of the end-effector link 17 with respect to the base frame. The IK process typically provides one or multiple (i.e. ambiguous) joint configurations, that fit to the observed pose of the end-effector link 17 given a model of the kinematic chain 1, such as a robot model.

Since the above strategy relies on a reliable pose determination, the characteristic feature 3 must be visible by a camera in all reachable/possible orientations and positions of the respective link 15. Generally, this means that a "circumferential feature" (as shown e.g. in FIG. 6 as feature 39) may advantageously be used, i.e. the feature is mounted such that it "surrounds" the respective link 15 and is visible from all, or at least most, orientations. To that end, it may be attached to a "feature mount" 37 (see e.g., FIG. 7) constructed to circumvent the link 15 to which it is mounted. Feasible structures for this feature mount include, as non-limiting examples, cylinders, spheres, cubes, regular dodecahedrons, or the like. The link 15 itself may also be used as a feature mount, for example by attaching a printed piece of paper, cartel or plastic around the link 15 circumferentially, or near-circumferentially.

Instead of using a single, circumventing characteristic feature 3—which is necessarily non-planar and only partially visible—multiple separate characteristic features with different orientations may be utilized. In this case, the pose of the link 15 is determined by the characteristic feature 3 which is currently visible the best in the provided image of the camera, e.g. based on its size in the image and its orientation.

2. Decomposition of the kinematic chains: The full kinematic chain 1 (typically, in exemplary robot arms, having 4, 5, or up to seven joints 11) is split into multiple connected sub-chains, see also FIG. 7. The split can occur e.g. after each second or third link 15. A feature 3 is attached to both the start/end links of each sub-chain, whereby the end link of one sub-chain is identical to the start link of the following sub-chain. Next, the state of each sub-chain is calculated similarly as above, by applying inverse kinematics (IK) separately to each sub-chain, using the poses of its respective start/end links. The reliability of the pose estimation may be enhanced by using circumferential features as discussed above. As an optional final step, the state of the entire kinematic chain 1 is refined, by applying IK locally in order to ensure consistency of the states of the joints 11 with the pose of the end-effector link 17.

The advantage of the above approach is that the estimation problem for the sub-chains is over-constrained, since only two or three degrees of freedom (dof) are estimated from a 6D pose. Therefore, by using simple data fusion, see further below, noise is reduced. Furthermore, the number of ambiguous solutions is reduced, and the complexity of IK is reduced when using a plurality of sub-chains, in comparison to IK for the entire kinematic chain 1.

Figure 6:
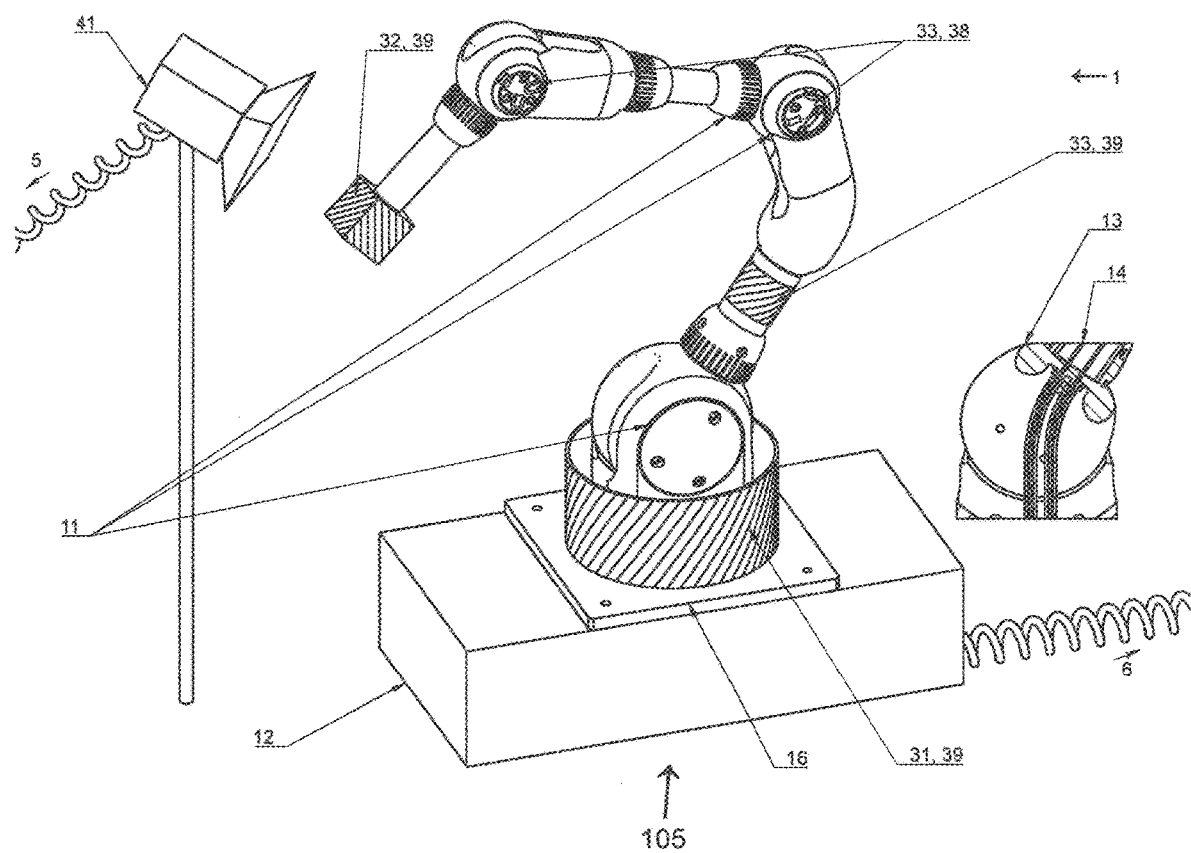
FIG. 6: A robot arm with six joints, with visual characteristic features at the arm.

3. Multiple features: In a modification of any of the above strategies, multiple characteristic features 3 are placed at different locations and with different orientations on each of the relevant links 15, see also FIG. 6. In FIG. 6, an exemplary and non-limiting, commercially available robot arm 105 with six joints 11 in a kinematic chain 1 is shown. The joints are connected with servo motors 12 under the base link 16 by Bowden cables 14 mounted through the robot arm, see cross section of base joint 13. Visual characteristic features 3, 31, 32, 33, 38, 39 are added to the arm. In an embodiment, features 31 on the base, features 32 on the end-effector, and one feature 33 on an inner link may be provided. At least one external camera 41 observes the features and connects to a computing unit 5. This system can be accurately controlled without any electric wires or electronic components in the moving parts of the arm. This allows for very light, passively safe and low-cost designs.

All visible features on a link are combined using simple data fusion to obtain one pose estimate. In the worst case, a single visible feature 3 would be sufficient for pose estimation of the respective link, yet fusion of multiple features improves accuracy of pose estimation, especially if features with different orientations or a large spatial distance are combined. With this strategy, any combination of visible features on a link is suitable for pose estimation of the respective link, but the set of links required for state estimation remains fixed. Similar to circumferential features, features are oriented such that there are always some visible features regardless of the orientation of the link.

4. High redundancy: Many visual features 3 are placed in a structured or unstructured way onto many or all links 15 of a robot arm 1. The objective is, firstly, to generally ensure a high number of visible features, providing highly redundant information about the arm and link poses, and, secondly, to always have a sufficient number of visible features without determined checks of observability, see below. The observation is no longer structured as in the previous approaches, since any combination of features may be visible. Therefore, a structural calculation of the joint state using IK is no longer possible. Instead, the state of the robot arm 1 is determined by a general framework for data fusion, see section 4, which determines the one state that fits best to the observation, i.e. the poses of the visible features 3. The framework uses all available measurements together with their respective accuracy of noise value. It considers the motion constraints given by the structure of the kinematic chain defined in a model of the robot, i.e. the joints and poses of the features with respect to the link. A general framework also allows for the integration of additional capabilities, such as the integration of models of elastic links or of features that typically only provide a partial pose, such as characteristic features having a line shape.

Robust control of the robot arm necessitates the observability of the robot state, i.e. that all joint states are calculable from the visual observation. This generally requires that at least one feature is observable by at least one camera 4, 41 on the end-effector link 17 and, in some configurations, on the base link 16. The observability for a given robot state is determined with a simulation process, given the placements of the camera(s) 4, 41 and a geometric model of the robot. The latter must include the poses of features on the links 15 of the robot. The simulation process determines the visibility of features and tests the process of joint state calculation. Additionally, the robustness of the measurement can be verified, e.g. by checking whether there is no single feature that is indispensable for the joint estimator.

To determine the observability for a given workspace, i.e. a space in which the robot arm operates, the above process is repeated for a set of configurations randomly or densely sampled from the workspace. The observability of a workspace is a score which describes the share of observable samples. It is acceptable that some configurations are not completely observable, if non-observability is locally limited. The robot arm must leave such configurations using the strategies described in section 8 below.

Various camera and/or feature configurations may be tested to find a configuration which covers the given workspace best, ensuring a minimal observability score of, e.g., 99%. Visibility of the entire robot arm/the kinematic chain in almost all configurations could be ensured by placing one camera 4, 41 at a large enough distance from the robot arm. However, this might not be feasible, since the image provided by the camera becomes less detailed with increasing distance. Furthermore, the end-effector link 17 might still be occluded by other links 15 of the arm. Therefore, a suitable strategy may be to cover the operating space by multiple cameras 4, 41, each of them covering only a section of the robot arm 1.

The cameras are typically extrinsically calibrated towards each other, or towards one reference in the world, such as the base link 16. Calibration provides the poses between cameras or between each camera and the reference. This calibration may be performed by estimation of the pose of a feature on the base 31 in each camera 4, 41. However, usually, pose estimates should not be converted into the frame of another camera, since small errors in the calibration may result in larger errors of pose estimation. Hence, advantageously, poses are only combined from the same camera, or poses may be estimated with respect to a common base which is visible in multiple cameras.

It is assumed above that the robot model, and especially the poses of features and feature mounts within the coordinate frame of the respective link, are known with great precision. In some cases, such as low-cost implementations, this assumption may not be feasible. Instead, some parameters of the robot model, such as poses of features and (angular) offsets of joints may be considered variable within a certain range. The values of these parameters are then estimated using a local optimizer, as discussed in section 9 below, based on a large number of feature observations in many different states of the arm.

4. Eye-in-Hand Camera

Figure 3:
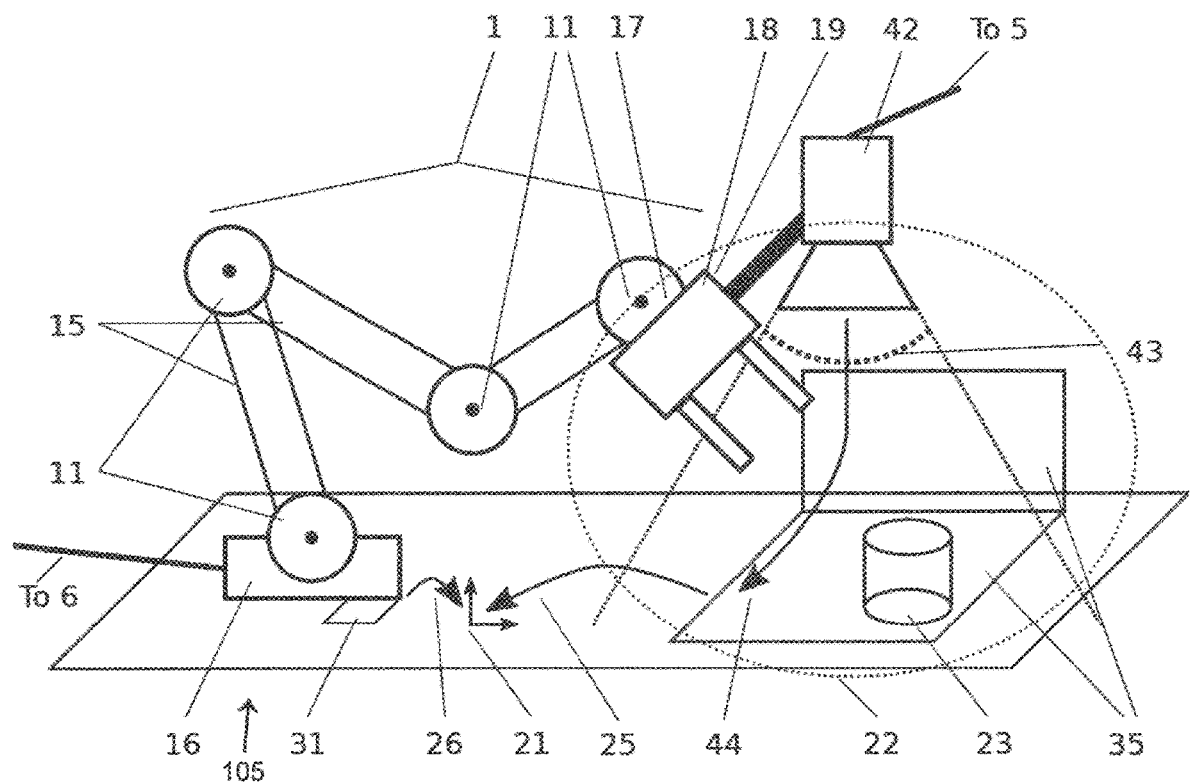
FIG. 3: A robot arm with sensors of a sensor system according to embodiments.
Figure 5:
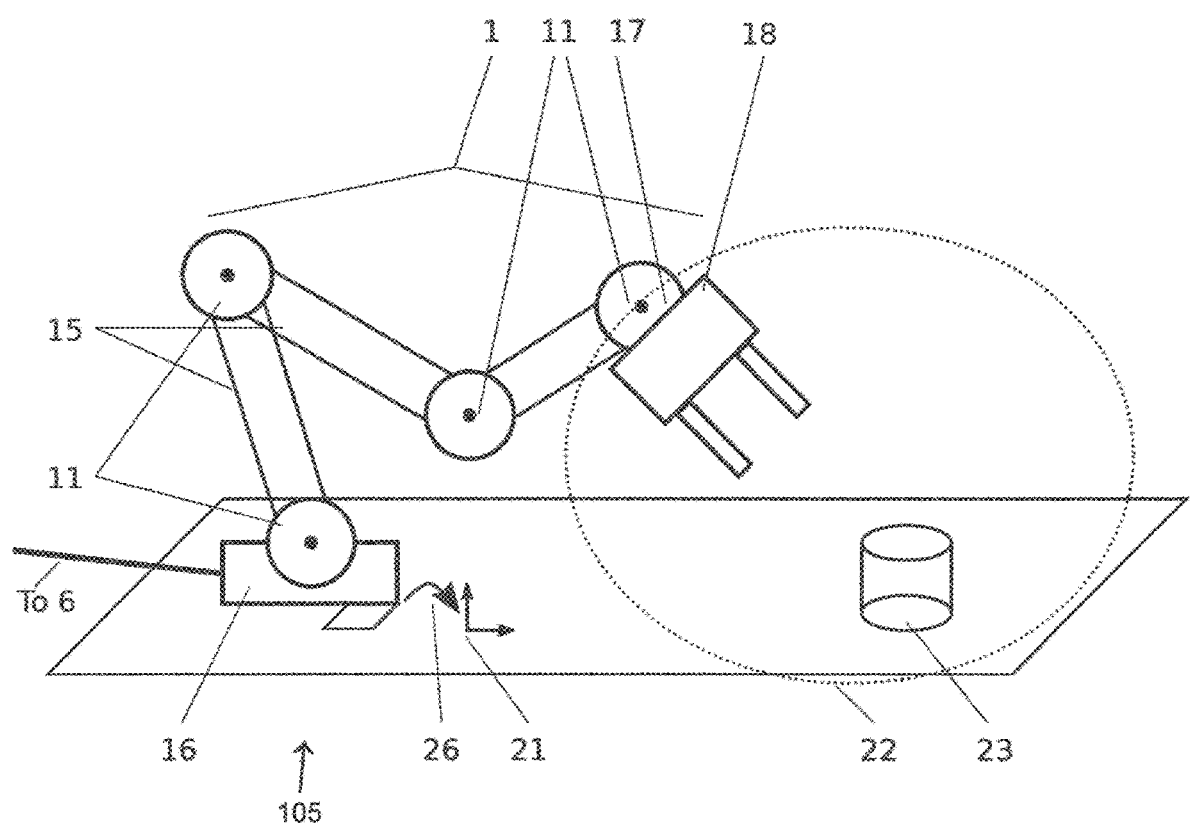
FIG. 5: An exemplary robot arm as is part of, or may be used with, embodiments described herein.

In the embodiment shown in FIG. 3, a camera 42 is mounted on any actuated link 15 of a kinematic chain 1, referred to as the camera link 19. Thereby, the camera may typically be rigidly mounted onto the end-effector link or equivalently, as in FIG. 3, onto the tool 18 rigidly connected to the end-effector link 17. This is generally referred to as an eye-in-hand setup. Thereby, a robot arm as is exemplarily shown in FIG. 5 may be used, having a base link 16, several links 15 connected by joints 11, and an end-effector link 17, optionally with a tool 18 attached to the end-effector-link 17. A camera 42 is mounted onto the end-effector link of a robot arm. The camera observes features in the world 35 under the workspace 22 and is connected to a computing unit 5. The robot arm is controlled by a control unit 6 (not shown).

The intrinsic camera parameters and the pose of the camera 42 within the coordinate frame of the link 17, 19 to which it is mounted are known. Therefore, if the camera pose is known, the pose of the link 17, 19 can be directly calculated. The camera observes a field of view 43 of the scene around the robot, i.e. of the "world". Visual features 35, such as exemplarily a template image, are attached within the scene in the viewing field of the camera 42. The appearance or structure of these features is known, respectively stored in the computing unit 5. The pose 25 of the visual features 35 with respect to an arbitrarily chosen referential world frame 21 (not shown) is also known. Furthermore, the pose 26 of the base link 16 is known with respect to the world frame 21.

In the embodiment, the state of the kinematic chain is estimated by a computing unit 5, i.e. the joint positions of up to six joints 11 between the base link 16 and the end-effector link 19 from a visual estimate of the pose 44 of camera 42, based on the image provided by that camera. The configuration of the kinematic chain, i.e. the structure of the links 15 and joints 11 and the dimensions of the links are known from a model of the robotic arm. The joint state is determined by a computing unit 5 using inverse kinematic (IK) based on the visually determined transformation between end-effector link 19 and base link 16. This transformation is identical to the pose of end-effector link 19 with respect to the frame spanned by base link 16.

The 6D pose 44 of camera 42 and thus also the pose of camera link 19 is determined with respect to the features in the scene by a pose estimator. The poses of base link 16 and are static and known with respect to a reference frame 21, such that pose of base link 16 with respect to the pose of camera 42 can be directly calculated. With the pose of camera link 19 being known with respect to base link 16, the joint states of the kinematic chain between those links are now determined using inverse kinematics. Ambiguous solutions are resolved as outlined below in 8.

The visual characteristic features 35 are placed such that they are at least partially visible to the camera 42 within the workspace 22 of the robot. This workspace may be much smaller than the mechanically reachable pose space and it is defined by the task to be performed by the robot.

For example, consider the task of grasping objects 23 on a table surface within workspace 22 from the top and moving them on this surface. A feature 35, such as planar templates, placed on the tabletop below the workspace 22 is sufficient for pose estimation, if the tool always points downwards. The planar template can be glued e.g. onto the table surface, a rigid plate or a feature mount 37 (not shown in FIG. 3, see e.g. FIG. 7). This plate is then attached to the table surface. In other cases, features could also be placed on side walls of the working space, as indicated in FIG. 3 as feature 35. General analysis of feature visibility is performed by simulation, as outlined in section 3.

The pose 25 of feature 35 within world frame 21 may be determined online, for instance to allow the end-user of the robot to place feature 35 arbitrarily. To that end, a feature 31 is attached to the base link 16 using a feature mount. The pose of feature 31 within base link 16 is known from the geometry of the feature mount. It is feasible to use the frame of base link 16 as the reference frame 21. In order to determine the static pose of feature 35 with respect to the feature 31 at the base link, camera 42, or another external camera, is placed such that it observes both feature 31 and some of features 35. By 6D pose estimation of both features, their transformation is directly determined. For improved accuracy, multiple measurements of this pose from different viewpoints should be integrated.

The precise knowledge on the pose of camera 42 on camera link 19 enables to determine correct joint estimates. The pose may be determined by measurement, for instance using methods for extrinsic camera calibration.

5. Markers for Direct Angle Estimation

Figure 4:
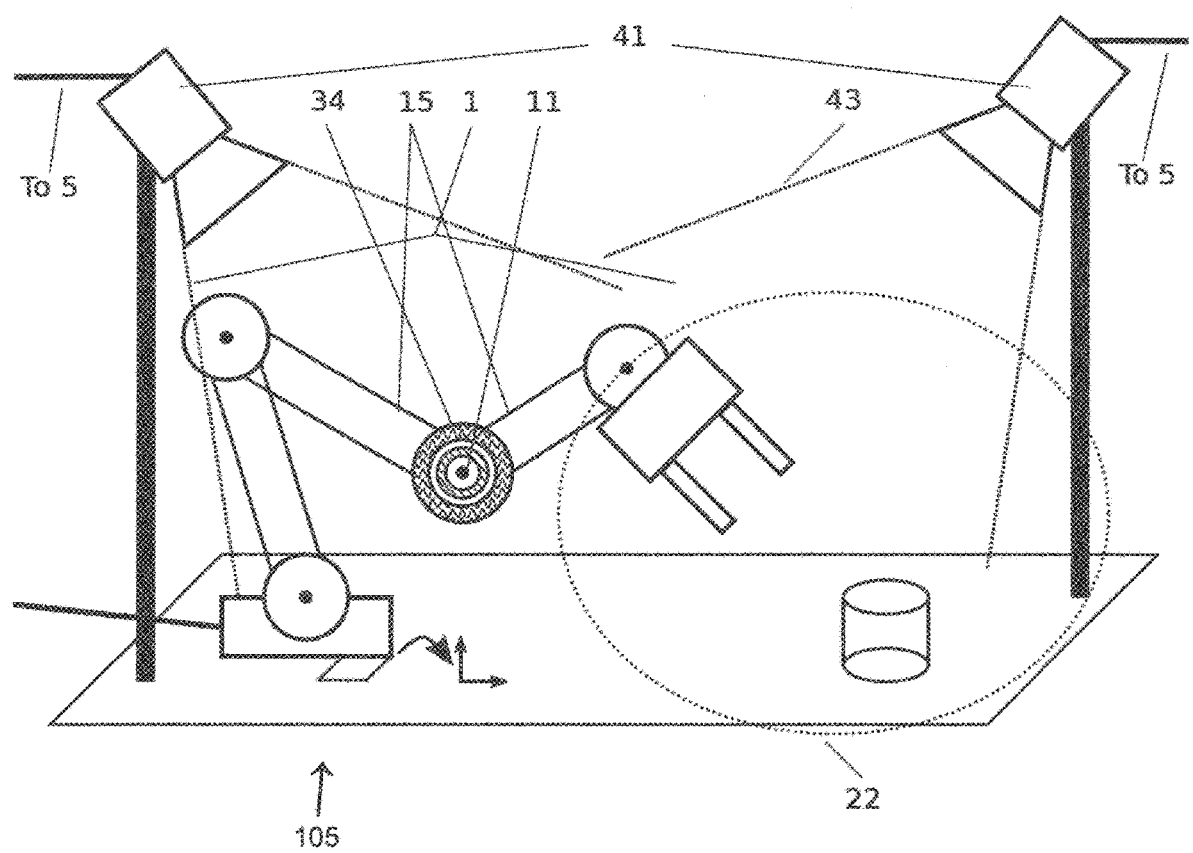
FIG. 4: A robot arm with sensors of a sensor system according to yet further embodiments.

In embodiments as shown in FIG. 4, one or several cameras 41 are mounted around the robot arm 1, within or nearby the operating workspace 22 of the robot arm. The external camera 41 observes visual markers/features 34 for direct angle measurement mounted around the axis of at least one joint 11. Thus, rotational visual markers 34 are mounted on some or all joints 11 of the robot arm 1, which are also called "marked joints". These markers consist of two parts, each of which is rigidly connected to one of the two links 15 connected by the joint 11. The relative orientation between these two parts, specifically the angle of rotation around the axis of joint 11, directly indicates the state of the joint 11. This allows for direct visual reading of the joint angle by the camera and a connected computing unit 5, much like a goniometer.

For the positioning of the cameras and visual observability, the same discussion as in section 3 applies. However, placement and orientation of the markers is more limited, since markers need to be placed close to or around the axes of joints 11. Observability of the markers is maximized for any link orientation, by the following means: (a) Multiple cameras are arranged around the robot; (b) markers are attached to both ends of the axis; (c) markers are designed such that they can be read from various viewpoints. For instance, a ring- or disk-shaped marker may be measured from many directions, if texture is applied to both the flat surface and on the side walls, ensuring sufficient thickness. It is sufficient to observe one marker per joint in one camera.

The described rotational marker 34 may be implemented using any scheme of 6D pose estimation for the two parts (links). Subsequently, a single value is extracted from these two poses, i.e. one relative rotation angle between the two links. However, this approach does not allow for optimal angle estimation with lowest noise. Therefore, a suitable approach is to use markers specifically designed for rotation estimation, as described in the following. In a first step, since the pose of the rotational marker 34 is not fixed with respect to the camera 41, the (rough) pose of the marker is determined by pose estimation, see section 2, using a nearby template or the texture of the rotatable marker 34 itself. The proposed two-piece marker consists of two concentric annuluses (or rings) 34, with only a small gap in between, rotating against each other with the joint. Each ring is textured with the same e.g. random radial pattern, used as a visual feature, radiating from the common center point of the rings. The textures on both rings are circularly regularly sampled along their respective mid-circle. This circle projects to an ellipse, given by the estimated pose. The respective rotation of the two rings is determined by cross-correlation or by the Fourier shift theorem from the two circular 1D samples. The Fourier shift theorem or phase correlation relates the phase in frequency domain to a shift in spatial domain. This approach uses all available pixels to estimate one value, resulting in reduced noise. The radial pattern design results in an increased tolerance to positioning errors during pose estimation, i.e. errors in the estimation of the ellipses.

6. Motor Velocity Estimation

In the following, a further concept according to embodiments is described. In the embodiment, visual joint estimation is used to determine the rotational velocity and, optionally, the angular position of motors used in the joints of a kinematic chain. Rotational markers 34 according to section 5 are mounted onto or near the motor shaft. The first part of the marker is connected rigidly with the motor housing, the second part is mounted directly onto the motor shaft, or via an auxiliary gear used to reduce the rotational velocity. It is feasible to mount it onto an extended shaft on the "rear side" of the motor, i.e. on the side opposing the gears. This extended shaft is typically used for electronic or optical encoders. This embodiment therefore replaces or complements such encoders. Alternatively, the second part may be connected to the shaft via a gearbox or a gearwheel.

Camera setup and the marker design are carried out as described in section 5. Differently to section 5, rotational markers are mounted onto the motor axis, instead of the joint axis. As a result, the rotational markers 34 may rotate much faster than in other embodiments, which must be considered by the computing unit 5. Processing is performed in two modes: In low-velocity mode, angular position of the rotational marker 34 is determined as described in section 5. The angular velocity is derived from the position differences and time differences determined between the video frames. Low-velocity mode is used if (a) there is no significant blur in the image and (b) the rotational rate of the motor is below the Nyquist rate. Blur is related to the exposure time of the camera(s) and is acceptable, as long as the position estimation is not disturbed. The rotational rate of the motor is given by the revolutions per second (rps), and Nyquist rate is given by the framerate of the camera (fps), limiting low-velocity mode to rps<0.5 fps. For higher velocities, the rotational speed is alternatively or additionally determined from the blur observed in the rotating part of the marker. The amount of angular blurb is determined by a blur estimator. The rotational speed of the motor is given by: $r=b/s$, where s is the exposure time of the camera. The blur estimator is applied to the angularly sampled signal from the rotation part of the marker, see section 5. With an appropriate blur estimator, any texture can be used on the marker. Radial black-white patterns allow for simple and robust blur estimation.

For simple blur estimation, a simple rotational marker 34 may be designed as follows: The rotating part of the marker is implemented as a disk, whereby the circular surface exhibits a sector of e.g. 90° colored black, while the remainder of the circle is white. With blur, the black-white edges are observed as a ramp signal. The angular blur b is the angle increment between the start and the end of this ramp, or it is determined from the slope of the ramp. With a maximal feasible blur of 180°, rotational velocities rps<0.5/s can be measured. Using an auxiliary gear with a transmission ratio 1:n, rps<0.5n/s. The lower limit is given by the minimal detectable blur. The former approach requires a camera with global shutter, or an image where the effects of a rolling shutter camera are compensated.

7. Combined Approaches

The above embodiments can be combined with each other and with state-of-the-art sensors in many ways. In the following, some examples for favorable combinations are given:

1. Velocities or rotation rates of the motor axes of the actuators 12, typically servo motors, may be obtained on all joints 11 or only on the lower joints using an electronic sensor ("encoder"). Velocity encoders are relatively simple and thus low-cost sensors. Also, they do not require calibration. Velocity control of motors is greatly simplified with an encoder. The lower joints, which exhibit load changes within a large range, can especially profit from this. Position control is performed using the further above described methods of embodiments. Therefore, complex absolute position sensors with high accuracy are not required on the joint axes. On robot designs with servo motors outside of the joints 11, or even outside of moving parts, see FIG. 6, the wiring of these encoders is greatly simplified.

2. Joints close to the base link ("lower joints") may be equipped with electronic sensors to measure position and velocity. The upper joints are measured and controlled using the visual methods of embodiments described above. This is feasible since the lower two to three joints of a robot arm are usually stronger, heavier and thus costlier than the upper joints. Precision and robustness guaranteed by electronic sensors is most important in the lower joints. Also, cabling of sensors is easier, since the cables do not go through many joints. The upper joints, on the other hand, profit from lower mass, smaller size, reduced costs and reduced cabling effort.

3. A camera may be put onto an actuated link within the kinematic chain, referred to as camera link 19 between the base link 16 and the end-effector link 17. This setup combines embodiments from sections 3 and 4. The camera is mounted and oriented such that it observes both the features 35 in the scene (see section 4), as well as the remaining links of the kinematic chain "in front of" the camera. The method described in section 4 is used to determine the state of the first part of the kinematic chain, i.e. the state of joints between the base link 16 and the camera link 19. The remainder of the chain, i.e. the joints "in front of" the camera, such as the wrist rotation and gripper joints, is determined as outlined in section 5, in section 7, or by direct tracking. This approach can be also applied to long kinematic chains with 7 or more joints. If the camera is mounted close to the tool 18 at the end-effector link 17, this setup benefits from advantages of the eye-in-hand setup, such as a detailed view of a grasped object 23.

4. Embodiments of section 5 allow for accurate angle estimation, but may be susceptible to occlusion of at least some of the joint markers. A combination of this embodiment with the embodiment of section 3 is straight-forward, since the camera setup is similar. A combination with the embodiments of section 4. is also possible. With the combined setups, joints with visible direct markers are estimated according to section 5, while the state of joints without visible markers is determined according to one of the other embodiments, using the state of known joints as a prior. Ambiguous solutions from IK are also greatly reduced.

5. Embodiments of section 6 provide a velocity estimate which is more accurate and reactive than velocity estimates derived from joint positions. It is therefore feasible to employ section 6 as a replacement of velocity encoders, together with a visual method for joint position estimation. Due to the similar camera setup, combinations with embodiments of section 3 and section 5 are preferred.

6. The joint velocity for all or some joints is obtained by a method for velocity estimation based on measurements of indirectly related physical properties ("sensorless methods", e.g. described in G. G. Rigatos and P. Siano: "Sensorless Control of Electric Motors with Kalman Filters: Applications to Robotic and Industrial Systems," Int. Journal of Advanced Robotic Systems, vol. 8, no. 6, pp. 62-80, 2011), such as the induced Back-EMF-voltage (electromagnetic-force-voltage) of the motor or the motor current and a model of the motor itself. Position information is obtained based on any of the described visual methods. This combination avoids both velocity sensors and absolute position sensors on the joints or servo motors.

8. Resolutions of Ambiguities

In an IK problem of up to six degrees of freedom (i.e., six joints), in the above embodiments, there are generally multiple solutions, i.e. multiple joint configurations that result in the same pose of a final or of an intermediate link. The structure of these solutions depends on the kinematic chain. The number of ambiguous solutions may be lowered or completely avoided by placing features accordingly, especially by placing features on intermediate links.

For robust control, a single correct solution should be identified. Therefore, typically the IK process needs to provide all mathematically and physically possible solutions that result in the observed pose. Notably, some iterative IK schemes do not exhibit this property. The correct solution out of a discrete set of solutions may be determined according to the following scheme:

In tracking mode, all possible solutions are kept and tracked between camera frames, resulting in multiple hypothesis of trajectories $S_{k,t}$, where t is the frame index and k represents the solution. Any solution $S_{k,t}$ in frame t is associated to a solution $S_{k,t+1}$ in frame i+1 by determination of the solution in t+1 with the smallest Euclidian distance to $S_{k,t}$. While the arm is moving, it is checked which of the trajectories $S_k$ fit to the commanded velocities. In most cases, one of the correct trajectory is quickly identified, since the direction of motion of at least one joint in incorrect solutions usually does not fit to or even opposes the commanded velocity. The correct solution is affirmed as soon as the motion of a joint is above a noise threshold. Statistical schemes, which determine the likelihood for each solution given the commanded velocity as a prior, may also be used. State tracking continues, even after the correct solution has been found.

As long as there are several possible configurations, safety checks such as collision detection are performed on all those configurations. If one of the checks fails, the system goes from tracking mode into recovery mode (see below). Tracking of the correct joint state may be lost due to several reasons, such as loss of the camera image or loss of the pose of an important feature. Also, the joint state is lost if two possible solutions are very close to each other or if the arm goes into a singular state (see below).

The solution space of an IK problem may also be infinite, which is referred to as a singularity. This is the case, for instance, if the axes of two joints are collinear: Any offset $+\alpha$ of the first joint could be compensated by $-\alpha$ on the second joint. Entries in the Jacobian become theoretically infinite (or very large in practical implementations), making it easy to detect a singularity. The system uses recovery mode (see below) to move out of a singularity. During trajectory planning, states close to singular configuration are avoided. Alternatively, a trajectory may also be planned to move the arm through a singularity with constant speed, if the time spent in the singular or close-to-singular state is limited.

In recovery mode, test motions are sent to single joints of the arm, while all other joints are stopped. Normal operation of the arm is interrupted in this mode. Test motions are small constant velocities of a single joint in positive or negative direction. Therefore, there is a set of 2n discrete test motion patterns, where n is the number of joints. Test patterns are selected using a greedy approach: It is determined which pattern would provide the largest information gain about the state of the kinematic chain, given the current knowledge about the state. The process is repeated until there is a set of discrete solutions that are all safe, such that the arm can be switched back to tracking mode. The information gain is determined using an exhaustive numerical method: For each combination of patterns and hypothetical states, the reduction of the size of hypothetical states is simulated. Infinite solutions spaces are sampled for this process.

9. Data Fusion

The described methods according to embodiments are designed to acquire visual data in a redundant fashion. This approach allows for noise reduction by fusion of multiple measurements and for robustness against failure of some measurements. Measurement failures of individual features may occur due to a number of reasons:

Non-visibility of features that are not oriented towards or not visible by any camera;

Occlusion of features by components of the robot arm, such as other links or cables, by external objects, or by a human;

Too large out-of-plane rotation, i.e. the feature is observed under an obtuse angle;

(Specular) reflection of a light source at the feature;

Dust or dirt on a feature.

Data or sensor fusion generally considers multiple sources, e.g. measurements from visual features, in order to obtain an accurate and robust estimate of an output signal, i.e. the joint positions, joint velocities, end-effector pose and other relevant poses. Commonly known methods or frameworks for data fusion consider all data sources and their respective certainty or noise level, typically expressed as a covariance matrix. The uncertainty of points in an image is generally expressed as an uncorrelated Gaussian distribution in the 2D image plane. A more elaborate simulation-based approach, applied to feature detectors, is described in L. Ferraz, X. Binefa, and F. Moreno-Noguer: "Leveraging Feature Uncertainty in the PnP Problem," British Machine Vision Conference (BMVC), 2014. The covariance matrix of a pose derived from these point measurements is obtained using standard analytical or numerical methods, see also Ferraz et al. Also, constraints of the system are considered during optimization in order to determine an accurate and robust estimate. Constraints include rigid connections between features, as well as rotations of revolute joints.

In the following, relevant cases of data fusion are described:

1) In case of pose estimation of a rigid structure, such as a link, with multiple features at different positions, as e.g. in embodiments of section 3 to section 4, there are generally multiple pose estimates from multiple visible features, each with a distinctive accuracy, expressed for instance by a covariance matrix. The optimal pose estimate is obtained e.g. as follows:
 a) Many methods for pose estimation provide an optimized estimate (in the ML sense, or by the least-squares error of some error measure), if a redundant number of points is provided. Therefore, the pose is simply estimated in a single step from all visible features. One such method is described in L. Ferraz, X. Binefa, and F. Moreno-Noguer: "Leveraging Feature Uncertainty in the PnP Problem," British Machine Vision Conference (BMVC), 2014.
 b) Any standard method for ML estimation or least-squares solving, which considers the covariance matrix, such as the Levenberg-Marquardt method.
 c) A general optimization framework, such as the graph-based g2o framework.

2) Other cases where there are multiple estimates for one value are treated as described in a) or b) above. For instance, in section 3, there are multiple estimates of a joint angle from different components of a pose estimate.

3) In case of more unstructured cases with multiple estimates and constraints, such as embodiment of section 3, general optimizers are required, such as the g2o framework. Constraints imposed by links and joints are modeled locally in the graph. However, such approaches do not consider the global constraints imposed by the kinematic chain. This means that the optimized end-effector pose is not ensured to be identical to the end-effector pose calculated by forward kinematics, based on the estimated joint positions. With most higher-level controllers, this would result in a reduced positioning accuracy of the robot arm. Therefore, the global constraints given by the kinematic chain are integrated in the optimization. The error between optimized and calculated end-effector pose is either added as an additional constraint in the graph (soft approach), or the joint positions are locally refined after the graph-based optimization using IK to fit to the optimized end-effector pose (hard approach).

10. Robot Arm Control

Figure 1B:
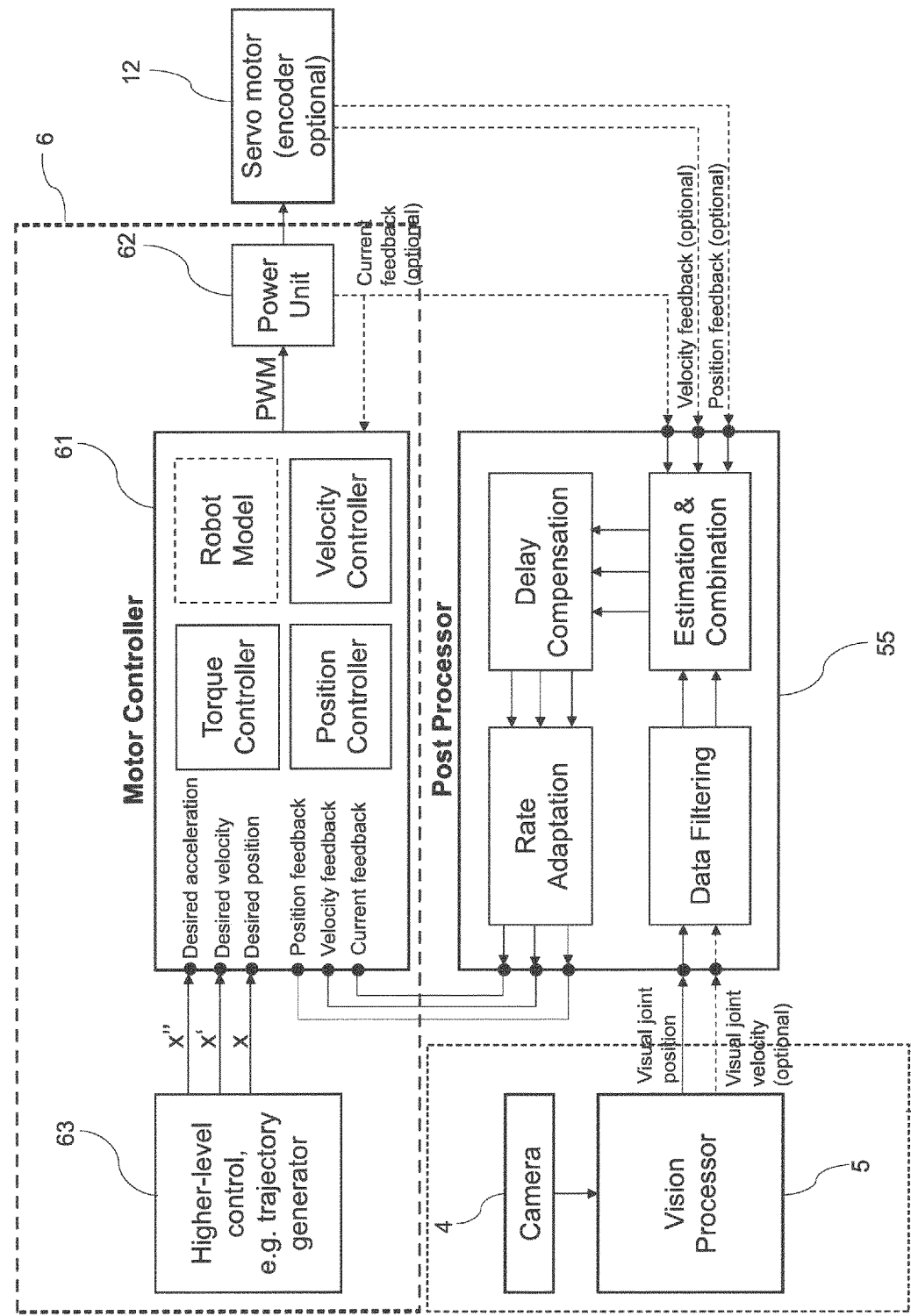
FIG. 1b: A system diagram schematically showing a control unit that controls servo motors of a robot arm, according to embodiments.

In order to control a robot arm 1 using one of the variants of the proposed sensor system 100 according to embodiments, the sensor signal from the computing unit 5 is connected to a control unit 6 comprising a motor controller 61, a high-level control unit 63 such as e.g. a trajectory generator, and a power unit 62, via a post-processor 55, see e.g. FIG. 1*b*. FIG. 1*b* shows a system diagram showing a control unit 6 that controls servo motors 12 of the robot arm 1. The high-level control unit 63 defines desired joint position/velocity/acceleration depending on the desired control mode. The low-level motor controller 61 controls the position, velocity and acceleration for each joint based on the feedback received by the post-processor 55. The post-processor filters, estimates and combines measurement data from the computing unit 5 and optionally the power unit 62 and the servo motors 12.

Depending on the deployed variant of the proposed visual sensor system and the desired control strategy, the motor controller is responsible for driving the actuators/motors 12 using a power unit 62, and eventually to control the motor torque, the motor velocity and the motor position. The post-processor 55 provides signals required by the motor controller and ensures the compatibility with existing hardware. The signals provided by the post-processor 55 replace the signals of dedicated electronic position or velocity sensors partially or completely, as outlined in section 7 above.

The post-processor provides estimates of
 the current angular or linear position,
 the current velocity,
 the current acceleration (optional),
 for each joint, and has the following functions:
 Filtering of vision-based signals: The noise of signals obtained by the computing unit varies, depending on viewing conditions and the conditioning of the IK process. Noise is of special relevance for velocity signals derived from visual measurements. A Kalman filter, or similar, is employed for de-noising and estimation of the correct signal value.

Rate adaption: The rate of the input signals of the motor controller generally differ from the rate of signals obtained by the vision sensor. The post-processor adapts the rates accordingly using common signal processing techniques like "extrapolation" or "hold last sample." Position signals may be extrapolated linearly, based on the velocity readings.

Delay compensation: The effect of delays, resulting e.g. from the read-out time of the camera, transmission times, communication delays or the processing time of the computing unit, are compensated by employing prediction using system models, e.g. using a Kalman filter or Smith Predictor.

Combination of multiple sensing sources: Signals from multiple sources, such as signals from optional velocity encoders, see section 7, are combined using rate adoption, extrapolation and filtering. For signals providing the same information, the signal with the best quality (i.e. lowest noise and lowest delay) may typically be used.

The above combination may also be applied to signals of multiple cameras or computing units, if fusion is not already performed by a single pose estimator. This is feasible for multiple non-synchronized cameras, which provide different accuracies, depending on their respective viewing condition.

Control in joint space: a standard motor controller may be used to control the servo motors in the robot arm. The position and velocity sensor inputs of the motion controller are connected to the post-processor. Standard industrial motion controllers use a cascaded PID-control structure with nested control loops for torque, velocity and position. The motor controller 61 provides a PWM signal to drive the motors via a power unit (typically comprising an H-bridge) 62. The power unit typically provides a current feedback signal for the motion controller. Trajectory planners or other standard higher-level control modules 63, see further above, connect to the motor controller and provide the desired joint position, velocity and/or acceleration depending on the desired control mode explained below.

Control in Cartesian space: In this mode, the motion of the tool is directly planned in a Cartesian space, e.g. in the reference frame of the tool 18 or the robot base 16. The high-level control module provides a desired Cartesian velocity (a "twist"), which is converted to a velocity in joint space using the Jacobian. The motor controller receives a velocity goal, but no position goal, in this case.

Planning in Cartesian space is done e.g. by most methods of higher-level planning, as well as by some methods of visual servoing. In embodiments of section 3 and section 4, the vision-based sensor system directly observes the Cartesian pose of the tool 18, while the joint positions are determined indirectly, through IK. As a result, the accuracy of the tool pose is relatively constant, while the accuracy of joint measurements varies greatly. The local relation between joint space and Cartesian space, linearized at one point in joint space, is typically represented by the Jacobian matrix. Most IK processes directly provide this Jacobian, otherwise it can be easily derived numerically. The Jacobian also shows how much an error of the tool pose is "amplified" in joint space. Due to its increased robustness to noise, this control mode is preferred, when possible. However, since the state of the robot is not directly controlled, this mode is incompatible with some control methods, and it is harder to ensure collision avoidance, as well as avoidance of joint limits.

More advanced control strategies comprise e.g. models of the mechanical structure of the robot, the sensor system and the motors including gears. Given the current state of the system, i.e. electric current, velocity and external load, such models allow to predict the system's behavior and can improve the quality of control. Furthermore, system variables that are not measured can be estimated using a model-based state observer. Model-based control ensures that motion commands are executed accurately and rapid, even without a high-rate feedback signal from the servos. Therefore, model-based control is preferred for vision-based sensing, if quick response time and accurate motions are required.

According to an embodiment, a sensor system for monitoring the status of a kinematic chain is provided. The sensor system may be a visual sensor system, i.e. a sensor system relying only on optical information for determining and monitoring the status of the kinematic chain. The kinematic chain has elements, comprising links and joints. The sensor system includes a computing unit and at least one imaging sensor operably connected to the computing unit. The at least one imaging sensor may be adapted to output an output signal to the computing unit, in particular via the operable connection. The computing unit is adapted to determine a pose and/or movement parameters of at least one element of the kinematic chain.

The at least one imaging sensor can be adapted to be mounted in the surroundings of the kinematic chain. Alternatively, the at least one imaging sensor can be adapted to be mounted to the kinematic chain, in particular to the at least one element of the kinematic chain. The at least one imaging sensor may be adapted for monitoring at least a part of the kinematic chain, in particular when being adapted to be mounted in the surroundings of the kinematic chain. Additionally or alternatively, the at least one imaging sensor may be adapted for monitoring the surroundings of the kinematic chain, in particular when being adapted to be mounted to the kinematic chain.

The computing unit may be adapted to determine the pose of at least one element of the kinematic chain. The computing unit may be adapted to determine the pose and/or the movement parameters of the at least one element by analyzing the output signal of the at least one imaging sensor. The computing unit may be adapted to determine the pose and/or the movement parameters of the at least one element by analyzing characteristic features in the output signal of the at least one imaging sensor. Therein, the computing unit is adapted to determine the pose and/or the movement parameters of the at least one element of the kinematic chain solely from the characteristic features represented by information contained in the output signal of the at least one imaging sensor. Further information is not required, such as information passed from electronic sensors/encoders, and the sensor system is a visual sensor system.

The at least one element may be at least one link, e.g., one link or two links, in particular a first link and a second link separated from each other by at least one intermediate link of the kinematic chain, such as by one, two, three or four intermediate links of the kinematic chain. The first link may be an end-effector link. The second link may be a base link. The first and second links may be the end links of a sub-chain of the kinematic chain, such as sub-chains with a length of three or four links. The characteristic features may include, or consist of, visual features of the at least one element, such as markers attached to the at least one element or characteristic shape(s) and/or textures of the at least one element. The characteristic features may be provided on at least one link and/or at at least one joint, in particular when the at least one imaging sensor is adapted to be mounted in the surroundings of the kinematic chain. The characteristic features may be provided on the at least one element. The characteristic features may be provided only on the at least one element. The characteristic features may be provided on the first link and on the second link. Intermediate link(s) located between the first link and the second link in the kinematic chain may be free of characteristic features. The characteristic features may be provided, alternatively or additionally, in the surroundings of the kinematic chain, in particular when the at least one imaging sensor is adapted to be mounted to the kinematic chain.

The computing unit may be adapted to determine a rotational joint position of at least one joint. The computing unit may be adapted to determine the rotational joint position of the at least one joint by analyzing the characteristic features. Therein, the computing unit may be adapted to determine the rotational joint position of the at least one joint by analyzing the characteristic features indirectly, i.e., by determining the rotational joint position of the at least one joint from the determined pose of at least one element of the kinematic chain, the determination of the pose of the at least one element being based on an analysis of the characteristic features in the output signal from the at least one imaging sensor. The at least one element may include the first link and the second link, and the at least one joint may be a number of k joints, wherein k may range from one to m, wherein m is one plus the number i of intermediate links located between the first link and the second link in the kinematic chain. Therein, the number i may be larger than zero, such as one, two, three or four. The k joints may be located between the first link the second link in the kinematic chain. Determination of the rotational joint position of the at least one joint may made from the determined pose of the first and second links. Alternatively, the computing unit may be adapted to determine the rotational joint position of the at least one joint by directly analyzing the characteristic features. The determination of the rotational joint position of the at least one joint may use stored information about the structure of the kinematic chain, such as information about the geometry and arrangement of the elements of the kinematic chain, in particular information about the geometry and arrangement of the first link and the second link, and any intermediate elements (intermediate links or joints). The computing unit may additionally be adapted to determine a rotational velocity and/or a rotational acceleration of the at least one joint by analyzing information about the characteristic features in the output signal of the at least one imaging sensor. The determination of the rotational joint position of the at least one joint, and optionally the determination of the rotational velocity and/or rotational acceleration of the at least one joint, does not require other information than the information about the characteristic features of the at least one link and the stored information to be taken into account.

The sensor system may include a control unit. The control unit may be operably coupled to the computing unit. The control unit may be configured to control the kinematic chain, particularly the joints of the kinematic chain. The control unit may be configured to control the rotational position of the at least one joint, and particularly the rotational position of all joints of the kinematic chain. The control unit may be configured to additionally control the rotational velocity and/or the rotational acceleration of the at least one joint or of all joints of the kinematic chain. The computing unit may be adapted to provide the determined rotational joint position of the at least one joint to the control unit, and optionally to provide the determined rotational velocity and/or rotational acceleration to the control unit. The control unit may be configured to control the at least one joint on the basis of the determined rotational joint position that the control unit received from the computing unit, and optionally in addition on the basis of the determined rotational velocity and/or rotational acceleration that the control unit received from the computing unit.

When the sensor system includes the control unit it becomes a control system for monitoring the status of the kinematic chain and for controlling the kinematic chain. The control unit may be adapted to control the kinematic chain, or at least the at least one joint, without requiring other control information than that provided by the computing unit and derived from the characteristic features. For instance, the control unit may not need information from electronic sensors/encoders. The control system can be a visual control system capable of controlling the kinematic chain, or at least the at least one joint, solely based on visual information about the characteristic features in the output signal of the at least one imaging sensor. This does not exclude that other information, e.g., information from electronic sensors/encoders, may be additionally taken into account, but such information is not necessary for the control exercised by the control system. The (visual) sensor system or (visual) control system may include any of the further features described herein, shown in the drawings or set forth in the claims. Further, with respect to embodiments relating to a method for determining a pose and/or movement parameters of at least one element of a kinematic chain, and optionally for controlling at least one joint of the kinematic chain, any of the functions of features of the systems described herein give rise to corresponding method features carrying out said functions.

Systems and methods according to embodiments offer a number of benefits, of which only some are exemplarily and briefly discussed in the following. Generally, a number of electronic sensor modules in a robot arm or robot may be reduced, or completely omitted. Hence, it is possible to build a controllable robot arm without any sensors in the arm itself. Thus, the hardware design in a robotic system may be greatly simplified. Further, conventionally, the installation of electric cables within a robot arm is complex and available space is very limited. Also, cables are mechanically stressed by the joint rotations. Since fewer or no sensor data needs to be transferred from the arm to a sensor system of embodiments, wiring within the arm can be strictly simplified by using fewer wires, by using combined wires for power supply and data transmission, or by relying on radio signals for data transmission. If servo motors are placed outside of the moving parts of the robot arm, such as exemplarily shown in FIG. 6, no wiring is required in the robot arm at all. The cited lower number of sensor modules also results in a reduced overall system complexity.

Conventional robot arms use multiple sensors in various locations, which all require their own processing units, networking and firmware, which goes along with a high complexity on multiple levels. Further, contrary to systems based on internal joint sensors, the disclosed camera-centric sensor system of embodiments is capable to observe small geometrical deviations in the links or joints. Therefore, the mechanical structure of the robotic arm or robot, and especially the links, may be designed with a reduced rigidity, i.e. they may be allowed to a certain extent to bend as a result of gravitational or acceleration forces, caused by the mass of the robot arm, a grasped object or the force of the actuator.

The resulting bending effects may either be implicitly mapped to the joint states, or may be modeled explicitly as Euler-Bernoulli beams. As a result of these relaxed requirements on rigidity allowed by systems and methods according to embodiments, link elements and also joints may be built with a smaller or thinner geometry and also from lighter materials. Further weight reductions result from the reduction of the number and complexity of electronic components and wiring.

Similar to the above, the precision requirements of structural elements are relaxed, both for manufacturing and assembly. Link elements may therefore be built using more low-cost techniques, such as plastic injection molding, or low-cost additive manufacturing, such as exemplarily, 3D printing.

For safe operation of robots working in the same workspace as humans (e.g., collaborative robots), the maximum impact pressure on contact with a human needs to be limited, as specified by the ISO norm ISO/TS 15066. Robot arms with a low moving mass, as described above, in the links and joints can fulfill such requirements passively, when torque and speed are also limited accordingly. In contrast, many existing designs require active control in order to operate safely, which may be omitted when using systems and methods according to embodiments.

Further, conventional distributed electronic sensor modules, which are hardware components, can in embodiments almost entirely be replaced by software modules. The software relies on the input of imaging sensors as described throughout this disclosure, which can be co-used (see below), and their placement is flexible and may be adapted in accordance with varying operating conditions. As a component mainly realized in software, the monitoring and sensing functions according to embodiments can be shifted to any suitable processing unit, e.g. a centralized processor such as in a general purpose computer. In contrast, in conventional designs, the sensing functions are typically distributed over multiple electronic modules. Also, the image-sensor-based sensor system may be easily adapted to new or modified robot arm designs. This allows, for instance, to adjust the lengths of link segments as required by the application.

As the imaging sensors according to embodiments are typically cameras with a high resolution, they may typically be used for a variety of complex tasks involving the pose estimation and object detection. Many 'intelligent' robots are already equipped with cameras suitable for methods and systems according to embodiments, such that a part of the hardware needed for their implementation is already available, hence reducing implementation costs.

Further, with methods and systems according to embodiments, a conventional mechanical calibration of joints or zero-referencing, which often requires manual steps, is not required and may be omitted. While there may be a need for intrinsic camera calibration, this step is typically only required once and can be automated. Also, mechanical play in joints is acceptable, such that joints, gears and servo motors may be built cheaper, lighter and smaller in comparison to conventional systems. Similar to the tolerable bending as described above, also mechanical play does not disturb the pose estimation of a link due to the observation principle by imaging sensors such as cameras. While the presence of play may require to slightly adapt or improve the control methods employed according to embodiments, especially low-cost and small robots can greatly profit from the enablement of simplified actuator and gear design.

The disclosed imaging-sensor based sensor systems according to embodiments are compatible to other camera-based sensors for tactile and force measurements. When used in combination therewith, the above-mentioned advantages also apply to a manipulator or tool of the robot.

The methods and systems according to embodiments can provide for a significant cost reduction in a variety of fields. For example, the costs for employed materials, the production costs, assembly costs and maintenance costs are all typically significantly reduced in comparison to conventionally designed sensor systems for robots. Due to their large prevalence in smartphones, tablet computers and generally consumer devices, cameras are available at very low costs in comparison to other types of sensors conventionally employed for the control of robot arms and robots.

The invention claimed is:

1. A sensor system (100) for monitoring a status of a kinematic chain (1) having elements comprising links (15) and joints (11), the sensor system comprising:
   a computing unit (5),
   at least one imaging sensor (4, 41, 42) operably connected to the computing unit (5),
   wherein the at least one imaging sensor (4, 41, 42) is adapted to be mounted to the kinematic chain (1) or to be mounted in the surroundings of the kinematic chain (1), and is further adapted for monitoring at least a part of the kinematic chain (1) and/or the surroundings of the kinematic chain (1), and
   wherein the computing unit (5) is adapted to determine a pose and/or movement parameters of the kinematic chain (1) by analyzing characteristic features (3, 31, 32, 33, 38, 39) in an output signal of the at least one imaging sensor (4, 41, 42),
   wherein the characteristic features are provided on at least one link (15), at at least one joint (11), and/or in the surroundings of the kinematic chain,
   wherein the computing unit (5) comprises
      a pose estimator adapted to determine 6D poses of each of the characteristic features and
      a joint state estimator to determine joint positions of the kinematic chain based on the 6D poses derived by the pose estimator, and
   wherein at least one of the characteristic features is a rotational visual marker (34) mounted on a marked joint (11), the rotational visual marker (34) comprising
      a first part rigidly connected to a first link connected by the marked joint and
      a second part rigidly connected to a second link connected by the marked joint, and
   wherein the computing unit (5) is configured to determine a relative orientation of the first part and the second part directly from the rotational visual marker (34).

2. The sensor system of claim 1, wherein the at least one imaging sensor (4, 41, 42) is a 2D video camera.

3. The sensor system of claim 1, wherein the computing unit (5) comprises:
   stored information about properties of the kinematic chain (1), and
   information about characteristic visual features (3, 31, 32, 33, 38, 39) of at least one element of the kinematic chain (1), and/or information about the surroundings of the kinematic chain (1).

4. The sensor system of claim 1, further comprising a control unit (6) operably coupled to the computing unit (5), wherein the computing unit (5) provides the determined relative orientation of the marked joint (11) to the control unit (6), and the control unit is adapted to control the relative orientation of the marked joint (11) based on the determined relative orientation.

5. The sensor system of claim 1, wherein the computing unit (5) is adapted to determine the rotational joint position of at least three joints (11) on the basis of an analysis of the characteristic features (3, 31, 32, 33, 38, 39) and of stored information on a structure of the kinematic chain (1).

6. The sensor system of claim 1, wherein the computing unit (5) comprises:
   stored information about properties of the kinematic chain (1), including geometrical data and data about the degrees of freedom of movement of the kinematic chain (1), and
   information about characteristic visual features (3, 31, 32, 33, 38, 39) of at least one element of the kinematic chain (1), and/or information about the surroundings of the kinematic chain (1).

7. A robot (105) including a kinematic chain (1) and the sensor system (100) of claim 1.

8. A sensor system (100) for monitoring a status of a kinematic chain (1) having elements comprising links (15) and joints (11), the sensor system comprising:
   a computing unit (5),
   at least one imaging sensor (4, 41, 42) operably connected to the computing unit (5),
   wherein the at least one imaging sensor (4, 41, 42) is adapted to be mounted to the kinematic chain (1) or to be mounted in the surroundings of the kinematic chain (1), and is further adapted for monitoring at least a part of the kinematic chain (1) and/or the surroundings of the kinematic chain (1), and
   wherein the computing unit (5) is adapted to determine a pose and/or movement parameters of the kinematic chain (1) by analyzing characteristic features (3, 31, 32, 33, 38, 39) in an output signal of the at least one imaging sensor (4, 41, 42),
   wherein the characteristic features are provided on at least one link (15), at at least one joint (11), and/or in the surroundings of the kinematic chain,
   wherein the computing unit (5) comprises
      a pose estimator adapted to determine 6D poses of each of the characteristic features and
      a joint state estimator to determine joint positions of the kinematic chain based on the 6D poses derived by the pose estimator, and
   wherein the pose estimator includes processing multiple threads, including
      a first thread that locates characteristic features whose pose is unknown, and
      a second thread that tracks characteristic features for which a pose estimate is available.

9. The sensor system of claim 8,
   wherein at least one of the characteristic features is a rotational visual marker (34) mounted on a marked joint (11), the rotational visual marker (34) comprising
      a first part rigidly connected to a first link connected by the marked joint and
      a second part rigidly connected to a second link connected by the marked joint, and
   wherein the computing unit (5) is configured to determine a relative orientation of the first part and the second part directly from the rotational visual marker (34).

10. The sensor system of claim 9,
   wherein at least one of the characteristic features (39) is a non-planar element that surrounds one of the links (15).

11. The sensor system of claim 9,
   wherein the at least one imaging sensor (4, 41, 42) is adapted to be mounted on an element of the kinematic chain (1) and is adapted to monitor the surroundings of the kinematic chain (1), and
   wherein the computing unit (5) is configured to determine the pose of the imaging sensor (4, 41, 42) from analyzing the output signal of the imaging sensor (4, 41, 42) and to determine a pose of at least one element in the kinematic chain (1) on the basis of the pose of the imaging sensor (4, 41, 42).

12. A method for determining a pose and/or movement parameters of at least one element of a kinematic chain (1) having elements comprising links (15) and joints (11), the method comprising:
   visually monitoring at least one element of the kinematic chain (1) and/or the surroundings of the kinematic chain (1) with at least one imaging sensor (4, 41, 42),
   identifying characteristic features (3, 31, 32, 33, 38, 39) of the at least one element or of the surroundings in an output signal of the imaging sensor (4, 41, 42),
   estimating 6D poses of the identified characteristic features (3, 31, 32, 33, 38, 39), and
   calculating the pose and/or the movement parameters of the at least one element on the basis of the estimated 6D poses, and determining a rotational joint position of at least one joint (11) by analyzing the characteristic features,
   wherein from an output signal of an imaging sensor (4, 41, 42) mounted to an element of the kinematic chain (1), the rotational joint position of at least three joints (11) is determined by a computing unit (5) by analyzing characteristic features (3, 31, 32, 33, 38, 39) in the surroundings of the kinematic chain (1) while taking into account information on the kinematic chain (1) stored in the computing unit (5).

13. The method of claim 12, wherein the imaging sensor (4, 41, 42) is mounted to a moving part of the kinematic chain (1), and wherein the computing unit (5) determines the pose of the imaging sensor (4, 41, 42) by analyzing features of the surroundings, and wherein the configuration of joints (11) between a base link (16) and the imaging sensor (4, 41, 42) is indirectly determined from the pose of the imaging sensor (4, 41, 42) and on the basis of information on the kinematic chain (1) stored in the computing unit (5).

14. A method for determining a pose and/or movement parameters of at least one element of a kinematic chain (1) having elements comprising links (15) and joints (11), the method comprising:
   visually monitoring at least one element of the kinematic chain (1) and/or the surroundings of the kinematic chain (1) with at least one imaging sensor (4, 41, 42),
   identifying characteristic features (3, 31, 32, 33, 38, 39) of the at least one element or of the surroundings in an output signal of the imaging sensor (4, 41, 42),
   estimating 6D poses of the identified characteristic features (3, 31, 32, 33, 38, 39), and
   calculating the pose and/or the movement parameters of the at least one element on the basis of the estimated 6D poses, and determining a rotational joint position of at least one joint (11) by analyzing the characteristic features,
   wherein estimating 6D poses of the identified characteristic features (3, 31, 32, 33, 38, 39) includes
      locating characteristic features whose pose is unknown in a first thread, and tracking characteristic features for which a pose estimate is available in a second thread.

15. The method of claim 14, wherein the characteristic features (3, 31, 32, 33, 38, 39) comprise
a 3D shape surrounding a link of the kinematic chain (1).

16. The method of claim 14, wherein from an output signal of an imaging sensor (4, 41, 42) mounted in the surroundings of the kinematic chain (1), the rotational joint position of at least one joint (11) is directly determined by a computing unit (5) by analyzing a rotational visual marker (34) mounted on the at least one joint (11).

17. The method of claim 14, wherein an estimation of the position of at least one joint (11) is carried out by monitoring optical markers and/or textures provided at a movable part of an actuator (12) and/or at a movable part of a gear operably connected to an actuator (12), and by determining the movement of a link (15) and/or joint (11) actuated by the actuator (12) from analyzing the movement of the optical markers or textures.

18. The method of claim 14, wherein from an output signal of an imaging sensor (4, 41, 42) mounted to an element of the kinematic chain (1), the rotational joint position of at least one joint (11) is determined by a computing unit (5) by analyzing characteristic features (3, 31, 32, 33, 38, 39) in the surroundings of the kinematic chain (1) while taking into account information on the kinematic chain (1) stored in the computing unit (5).

19. The method of claim 14, wherein from an output signal of an imaging sensor (4, 41, 42) mounted in the surroundings of the kinematic chain (1), the rotational joint position of at least three joints (11), is determined by a computing unit (5) by analyzing characteristic features (3, 31, 32, 33, 38, 39) of the at least one joint (11) and/or of at least one link (15) connected to it.

20. The method of claim 14, wherein from an output signal of an imaging sensor (4, 41, 42) mounted to an element of the kinematic chain (1), the rotational joint position of at least three joints (11) is determined by a computing unit (5) by analyzing characteristic features (3, 31, 32, 33, 38, 39) in the surroundings of the kinematic chain (1) while taking into account information on the kinematic chain (1) stored in the computing unit (5).

* * * * *